United States Patent
Takeuchi et al.

(10) Patent No.: US 10,538,434 B2
(45) Date of Patent: *Jan. 21, 2020

(54) TITANIUM OXIDE AEROGEL PARTICLE, PHOTOCATALYST FORMING COMPOSITION, AND PHOTOCATALYST

(71) Applicant: FUJI XEROX CO., LTD., Tokyo (JP)

(72) Inventors: Sakae Takeuchi, Minamiashigara (JP); Hiroyoshi Okuno, Minamiashigara (JP); Hideaki Yoshikawa, Minamiashigara (JP); Yasuo Kadokura, Minamiashigara (JP); Yasunobu Kashima, Minamiashigara (JP); Takeshi Iwanaga, Minamiashigara (JP); Shunsuke Nozaki, Minamiashigara (JP); Yuka Zenitani, Minamiashigara (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,439

(22) Filed: May 24, 2018

(65) Prior Publication Data
US 2019/0077675 A1  Mar. 14, 2019

(30) Foreign Application Priority Data

Sep. 8, 2017 (JP) .................. 2017-173385
Sep. 8, 2017 (JP) .................. 2017-173386

(51) Int. Cl.
*C01G 23/08* (2006.01)
*B01J 35/00* (2006.01)
*B01J 21/06* (2006.01)

(52) U.S. Cl.
CPC ............ *C01G 23/08* (2013.01); *B01J 21/063* (2013.01); *B01J 35/004* (2013.01); (Continued)

(58) Field of Classification Search
CPC ........ C01G 23/08; B01J 21/063; B01J 35/004
See application file for complete search history.

(56) References Cited

U.S. PATENT DOCUMENTS

| 5,411,761 A | 5/1995 | Inokuchi et al. |
| 5,919,422 A | 7/1999 | Yamanaka et al. |

(Continued)

FOREIGN PATENT DOCUMENTS

| JP | H05-221640 A | 8/1993 |
| JP | 2001-269573 A | 10/2001 |

(Continued)

OTHER PUBLICATIONS

Wei et al (UV-resistant hydrophobic rutile titania aerogels synthesized through a nonalkoxide ambient pressure drying process, J. Mater. Res. vol. 28 No. 3, (2013), pp. 378-384). (Year: 2013).*

(Continued)

*Primary Examiner* — Melvin C. Mayes
*Assistant Examiner* — Michael Forrest
(74) *Attorney, Agent, or Firm* — Oliff PLC

(57) ABSTRACT

A titanium oxide aerogel particle includes a metallic compound that has a metal atom and a hydrocarbon group, the metallic compound being bonded to a surface of the aerogel particle via an oxygen atom. The titanium oxide aerogel particle has a BET specific surface area of 120 m²/g to 1000 m²/g, and has absorption at wavelengths of 450 nm and 750 nm.

13 Claims, 1 Drawing Sheet

(52) U.S. Cl.
CPC ...... *C01P 2004/51* (2013.01); *C01P 2004/62* (2013.01); *C01P 2004/64* (2013.01); *C01P 2006/12* (2013.01); *C01P 2006/16* (2013.01)

(56) References Cited

U.S. PATENT DOCUMENTS

| | | | |
|---|---|---|---|
| 6,235,270 B1 | 5/2001 | Ishii et al. | |
| 6,777,374 B2 | 8/2004 | Sahle-Demessie et al. | |
| 7,090,823 B1 | 8/2006 | Liu | |
| 7,153,808 B2 | 12/2006 | Iwamoto et al. | |
| 7,211,543 B2 | 5/2007 | Nakabayashi et al. | |
| 7,524,793 B2 | 4/2009 | Orth-Gerber et al. | |
| 7,615,512 B2 | 11/2009 | Orth-Gerber et al. | |
| 7,858,553 B2 | 12/2010 | Scott et al. | |
| 7,887,779 B2 | 2/2011 | Scott et al. | |
| 7,959,980 B2 | 6/2011 | Nakajima et al. | |
| 7,998,453 B2 | 8/2011 | Scott et al. | |
| 9,394,623 B2 | 7/2016 | Grimes et al. | |
| 9,604,198 B2 | 3/2017 | Furudate et al. | |
| 9,744,523 B2 | 8/2017 | Idriss et al. | |
| 9,833,776 B2 | 12/2017 | Furudate et al. | |
| 10,155,220 B2* | 12/2018 | Kashima | B01J 35/004 |
| 10,183,275 B2* | 1/2019 | Okuno | B01J 21/063 |
| 2004/0248075 A1 | 12/2004 | Yamaguchi et al. | |
| 2005/0227008 A1* | 10/2005 | Okada | B01D 53/8609 |
| | | | 427/372.2 |
| 2006/0009351 A1 | 1/2006 | Iwamoto et al. | |
| 2006/0162617 A1 | 7/2006 | Tanaka et al. | |
| 2007/0248831 A1 | 10/2007 | Nishihara et al. | |
| 2008/0112880 A1 | 5/2008 | Kayama et al. | |
| 2008/0261805 A1 | 10/2008 | Kanehira et al. | |
| 2008/0268268 A1 | 10/2008 | Masaki et al. | |
| 2010/0279118 A1 | 11/2010 | Hempenius | |
| 2011/0159109 A1 | 6/2011 | Lee et al. | |
| 2012/0060269 A1 | 3/2012 | Tong | |
| 2012/0083409 A1 | 4/2012 | Okuyama et al. | |
| 2012/0122668 A1 | 5/2012 | Celiker et al. | |
| 2012/0270028 A1 | 10/2012 | Orth-Gerber et al. | |
| 2013/0164444 A1 | 6/2013 | Tokumitsu et al. | |
| 2013/0284209 A1 | 10/2013 | Kim et al. | |
| 2013/0288055 A1 | 10/2013 | Doshita et al. | |
| 2016/0096949 A1* | 4/2016 | Evans | C08K 3/22 |
| | | | 521/122 |
| 2017/0218204 A1 | 8/2017 | Edwards et al. | |
| 2017/0252724 A1 | 9/2017 | Yoshikawa et al. | |
| 2017/0252736 A1 | 9/2017 | Hirose et al. | |

FOREIGN PATENT DOCUMENTS

| | | |
|---|---|---|
| JP | 2004-115541 A | 4/2004 |
| JP | 2006-021112 A | 1/2006 |
| JP | 2006-247524 A | 9/2006 |
| JP | 2006-281155 A | 10/2006 |
| JP | 2007-016111 A | 1/2007 |
| JP | 2008-212841 A | 9/2008 |
| JP | 2009-131760 A | 6/2009 |
| JP | 2010-006629 A | 1/2010 |
| JP | 2011-057552 A | 3/2011 |
| JP | 2013-249229 A | 12/2013 |
| JP | 2014-128768 A | 7/2014 |
| JP | 2014-188417 A | 10/2014 |
| JP | 2015-116526 A | 6/2015 |
| JP | 2015-142917 A | 8/2015 |
| JP | 2015-156509 A | 8/2015 |
| JP | 2016-064407 A | 4/2016 |
| JP | 2016-221447 A | 12/2016 |
| JP | 2017-035645 A | 2/2017 |
| WO | 2008/108367 A1 | 9/2008 |

OTHER PUBLICATIONS

Mar. 20, 2018 Office Action issued in U.S. Appl. No. 15/679,476.
Apr. 4, 2019 Office Action issued in U.S. Appl. No. 15/908,219.
Apr. 20, 2018 Office Action issued in U.S. Appl. No. 15/491,030.
Sep. 27, 2017 Office Action issued in U.S. Appl. No. 15/491,030.
U.S. Appl. No. 15/908,219, filed Feb. 28, 2018 in the name of Yoshikawa et al.

* cited by examiner

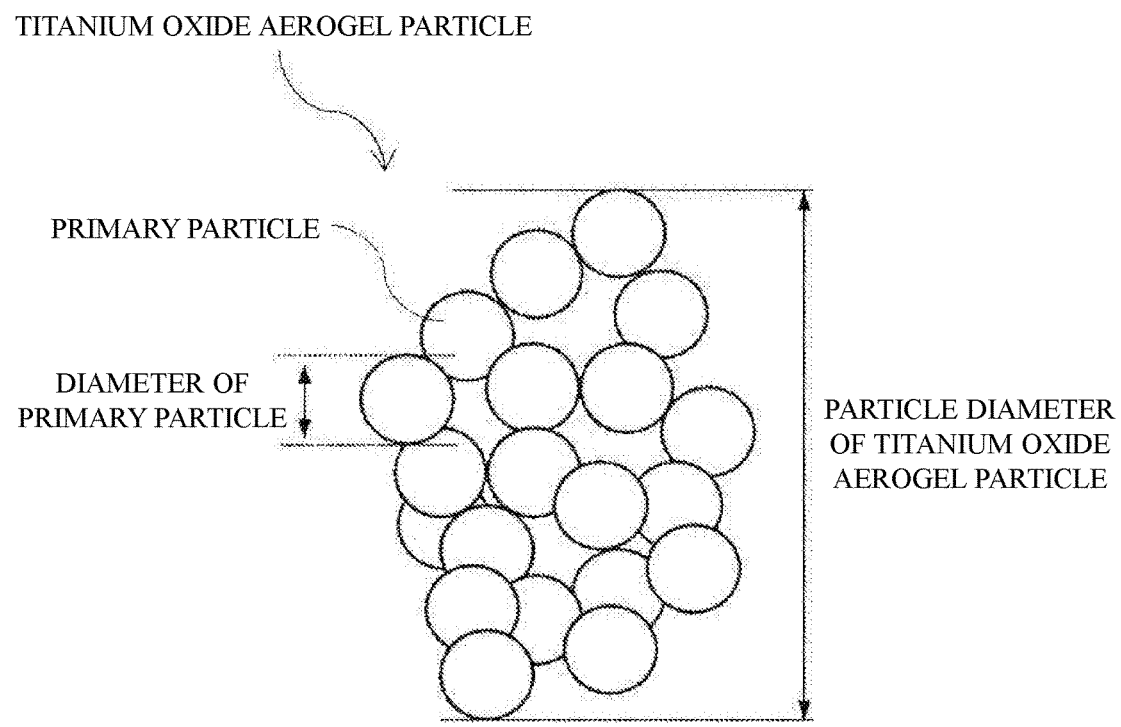

TITANIUM OXIDE AEROGEL PARTICLE, PHOTOCATALYST FORMING COMPOSITION, AND PHOTOCATALYST

CROSS-REFERENCE TO RELATED APPLICATIONS

This application is based on and claims priorities under 35 USC 119 from Japanese Patent Application No. 2017-173385 filed on Sep. 8, 2017 and Japanese Patent Application No. 2017-173386 filed on Sep. 8, 2017.

BACKGROUND

Technical Field

The present invention relates to a titanium oxide aerogel particle, a photocatalyst forming composition, and a photocatalyst.

Related Art

A titanium oxide particle is known to be utilized as a photocatalyst.

A titanium oxide particle commonly used as a photocatalyst material exhibits a photocatalytic function by absorbing ultraviolet light.

On the other hand, as a technique for increasing the specific surface area exhibiting the photocatalytic function, a photocatalyst material obtained by attaching a photocatalyst particle to a pore surface of a porous material formed of a microporous material such as zeolite and silica gel or a mesoporous material is known.

SUMMARY

According to an aspect of the invention, there is provided a titanium oxide aerogel particle including a metallic compound which has a metal atom and a hydrocarbon group, the metallic compound being bonded to a surface of the aerogel particle via an oxygen atom. The titanium oxide aerogel particle has a BET specific surface area of 120 $m^2/g$ to 1000 $m^2/g$, and has absorption at wavelengths of 450 nm and 750 nm.

BRIEF DESCRIPTION OF DRAWINGS

Exemplary embodiment(s) of the present invention will be described in detail based on the following FIGURE, wherein:

the FIGURE is a schematic view illustrating a titanium oxide aerogel particle according to the exemplary embodiment.

DETAILED DESCRIPTION

Hereinafter, embodiments of the invention will be described. These descriptions and examples are illustrative of embodiments and are not limited to the scope of the invention.

In the present specification, in a case where there are various kinds of substances corresponding to the components in a composition, unless otherwise specified, the amount of each component in the composition means a total amount of the various kinds of substances. The term "step" includes not only an independent step, but also includes a step which is not clearly distinguished from other steps as long as the step achieves the intended purpose thereof. The term "XPS" stands form X-ray Photoelectron Spectroscopy.

<Titanium Oxide Aerogel Particle>

The titanium oxide aerogel particle according to the exemplary embodiment includes a metallic compound which has a metal atom and a hydrocarbon group and the metallic compound is bonded to the surface of the titanium oxide aerogel particle via an oxygen atom. The titanium oxide aerogel particle has a BET specific surface area of 120 $m^2/g$ to 1000 $m^2/g$, and has absorption at wavelengths of 450 nm and 750 nm in the visible absorption spectrum.

Here, the FIGURE is a schematic view illustrating the titanium oxide aerogel particle according to the exemplary embodiment. As illustrated in the FIGURE, the titanium oxide aerogel particle according to the exemplary embodiment has an aerogel structure in which the primary particles are aggregated while forming a porous structure. Note that, "aerogel" refers to a structure in which the primary particles are aggregated while forming a porous structure. The inside of the aerogel particle has a three-dimensional mesh-like fine structure and has a cluster structure in which a spherical bodies of several nm are bonded.

Since the titanium oxide aerogel particle according to the exemplary embodiment includes a number of fine pores and voids in the particle, the titanium oxide aerogel particle has a BET specific surface area (a BET specific surface area of 120 $m^2/g$ to 1000 $m^2/g$) which is large for a particle diameter compared with a non-porous titanium oxide particle in the related art. Coupled with the fact that the organometallic compound is bonded to a surface of the titanium oxide aerogel particle via an oxygen atom, it is inferred that the titanium oxide aerogel particle has absorption at wavelengths of 450 nm and 750 nm in a visible absorption spectrum, that is, the titanium oxide aerogel particle exhibits a photocatalytic function even in the visible light region (that is, high visible light responsiveness).

Specifically, although the detailed mechanism is unknown, it is inferred that when an organometallic compound in which the hydrocarbon group is appropriately oxidized is present on the surface or in the fine pores of the titanium oxide aerogel particle, the titanium oxide aerogel particle exhibits the optical absorption properties at wavelengths of 450 nm and 750 nm, and as a result, the titanium oxide aerogel particle exhibits the photocatalytic function even in the visible light region.

In addition, when the BET specific surface area of the titanium oxide aerogel particle is equal to or greater than 120 $m^2/g$, the specific surface area is large with respect to the amount, and thereby the photocatalytic function is improved. When the BET specific surface area of the titanium oxide aerogel particle is equal to or less than 1000 $m^2/g$, the ratio of coarse particles (particles having a particle diameter of greater than 20 µm) is low, and thereby particle dispersibility is improved in a photocatalyst forming composition, a photocatalyst, or a structure body, which will be described below, and it is likely to exhibit high photocatalytic function. For this reason, when the BET specific surface area of the titanium oxide aerogel particle is within the above range, it is likely to exhibit high photocatalytic function in the visible light region. Note that, from the above viewpoint, the BET specific surface area of the titanium oxide aerogel particle is preferably 150 $m^2/g$ to 900 $m^2/g$, and is more preferably 180 $m^2/g$ to 800 $m^2/g$.

The BET specific surface area of the titanium oxide aerogel particle is obtained by using a gas adsorption method using a nitrogen gas. Detailed measurement methods are as described in [Examples] to be described later.

Further, the titanium oxide aerogel particle according to the exemplary embodiment has a porous structure in which the primary particles are collected. In addition, an average diameter of the primary particles of the titanium oxide aerogel particle may be 1 nm to 120 nm. When the average primary particle diameter is equal to or greater than 1 nm, the porous structure is formed and a size of a fine pore diameter of the surface of an aggregated particle becomes appropriate, the adsorptivity of the photolysis object is improved, and thereby it is likely to exhibit the photocatalytic function in the visible light region. When the average primary particle diameter is equal to or less than 120 nm, the primary particles are aggregated while forming a porous structure so that an aerogel structure is easily formed, and thereby it is likely to exhibit high photocatalytic function in the visible light region.

From the above-described viewpoint, the average primary particle diameter of the titanium oxide aerogel particle is preferably 5 nm to 100 nm, and is more preferably 10 nm to 90 nm.

A volume average particle diameter of the titanium oxide aerogel particle according to the exemplary embodiment may be 0.1 μm to 3 μm. When the volume average particle diameter is equal to or greater than 0.1 pun, the primary particles form a porous structure and the adsorptivity of photolysis objects tends to be improved due to the high BET specific surface area. With this, it is likely to exhibit a high photocatalyst effect. When the volume average particle diameter is equal to or less than 3 μm, the coarse particles are less, and the dispersibility of the titanium oxide aerogel particle in a photocatalyst forming composition, a photocatalyst, or a structure body which are described below is improved, and thereby the photocatalytic function is improved. For this reason, when the volume average particle diameter of the titanium oxide aerogel particle is within the above range, it is likely to exhibit high photocatalytic function in the visible light region.

From the above-described viewpoint, the volume average particle diameter of the titanium oxide aerogel particle is preferably 0.3 μm to 2.8 μm, and is more preferably 0.5 μm to 2.5 μm.

The particle diameter of the titanium oxide aerogel particle is a particle diameter of the aggregated particle (aggregated particle diameter). The volume average particle diameter of the titanium oxide aerogel particle is a particle diameter of cumulative 50% from the small diameter side in volume-based particle size distribution.

The volume particle size distribution of the titanium oxide aerogel particle according to the exemplary embodiment may be 1.5 to 10. When the volume particle size distribution is equal to or greater than 1.5, the primary particles form a porous structure and the adsorptivity of photolysis objects tends to be improved due to the high BET specific surface area. With this, it is likely to exhibit a high photocatalyst effect. When the volume particle size distribution is equal to or less than 10, the coarse particles are less, and the dispersibility of the titanium oxide aerogel particle in a photocatalyst forming composition, a photocatalyst, or a structure body which are described below is improved, and thereby the photocatalytic function is improved. For this reason, when the volume particle size distribution of the titanium oxide aerogel particle is within the above range, it is likely to exhibit high photocatalytic function in the visible light region.

From the above-described viewpoint, the volume particle size distribution of the titanium oxide aerogel particle is preferably 2 to 9, and is more preferably 3 to 7.

The volume particle size distribution of the titanium oxide aerogel particle in the exemplary embodiment is defined as $(D90v/D10v)^{1/2}$. Here, D90v is a particle diameter of cumulative 90% from the small diameter side in volume-based particle size distribution, and D10v is a particle diameter of cumulative 10% from the small diameter side in volume-based particle size distribution.

Note that, the titanium oxide aerogel particle according to the exemplary embodiment is supposed not only to have a high surface area but also to enhance the photocatalytic function because the capture property of the decomposition object is enhanced by the porous structure.

The method of measuring the average primary particle diameter, the volume average particle diameter, and the volume particle size distribution of the titanium oxide aerogel particle according to the exemplary embodiment is as described in [Examples] described below.

The titanium oxide aerogel particle according to the exemplary embodiment has absorption at wavelengths of 450 nm and 750 nm in a visible absorption spectrum. From the viewpoint of exhibiting high photocatalytic function, the titanium oxide aerogel particle according to the exemplary embodiment preferably has absorption at wavelengths of 450 nm, 600 nm, and 750 nm in a visible absorption spectrum, more preferably has absorption at wavelengths in the entire range of 450 nm to 750 nm in the visible absorption spectrum, and particularly preferably has absorption at wavelengths in the entire range of 400 nm to 800 nm even in the visible absorption spectrum.

From the viewpoint of exhibiting high photocatalytic function even in the visible light region, the titanium oxide aerogel particle according to the exemplary embodiment, in a UV visible absorption spectrum, when the absorbance at a wavelength of 350 nm is set to be 1, the absorbance at a wavelength of 450 nm is preferably equal to or greater than 0.03 (more preferably equal to or greater than 0.1, and still more preferably equal to or greater than 0.2), the absorbance at a wavelength of 600 nm is equal to or greater than 0.03 (more preferably equal to or greater than 0.1, and still more preferably equal to or greater than 0.2), and the absorbance at a wavelength of 750 nm is equal to or greater 0.02 (more preferably equal to or greater than 0.1, and still more preferably equal to or greater than 0.2).

The UV visible absorption spectrum of the titanium oxide aerogel particle is obtained by measuring the diffuse reflection spectrum in the wavelength range from 200 nm to 900 nm and theoretically obtaining the absorbance at each wavelength by Kubelka-Munk conversion from the diffuse reflection spectrum. Detailed measurement methods are as described in [Examples] to be described later.

The measurement of the UV visible absorption spectrum is performed by using the following method.

First, the titanium oxide aerogel particle to be measured is dispersed in tetrahydrofuran, then applied onto a glass substrate, and the applied glass substrate is dried at 24° C. in the atmosphere. The measurement is carried out by diffuse reflection arrangement and the absorbance is theoretically obtained by Kubelka-Munk conversion. The diffuse reflection spectrum is measured by using a spectrophotometer (manufactured by Hitachi High-Technologies Corporation. U-4100) under [Measurement under the measurement conditions; scan speed: 600 nm, slit width: 2 nm, sampling interval: 1 nm, total reflectance measurement mode] with reflectance at a wavelength in a range of 200 n to 900 nm, and subjected to the Kubelka-Munk conversion so as to obtain a visible absorption spectrum.

Further, it is preferable to use a particle having a surface on which the element ratio C/Ti of carbon C to titanium Ti is 0.3 to 1.5.

The element ratio C/Ti of 0.3 to 1.5 on the surface of the titanium oxide aerogel particle indicates an appropriate ratio C/Ti as compared with the general titanium oxide particle which is surface-treated by a metal-containing compound having a hydrocarbon group or the untreated titanium oxide particle.

When the ratio C/Ti on the titanium oxide aerogel particle surface is 0.3 to 1.5, a carbon amount such as a hydrocarbon group on the titanium oxide aerogel particle surface is appropriate, has sufficient absorption having the wavelengths of 450 nm and 750 nm, and exhibits high photocatalytic function in the visible light region. In addition, particle cohesiveness is small due to the carbon amount such as a hydrocarbon group on the appropriate titanium oxide aerogel particle surface, and dispersibility to a binder is further improved.

In addition, in general, the untreated titanium oxide particle tends to have low controllability of a particle diameter, particle size distribution, and a particle shape, and tend to have high particle cohesion. For this reason, the dispersibility of the titanium oxide particle in the resin and in the liquid is poor, (1) the photocatalytic function is difficult to be exhibited, and (2) the transparency of the film and the like and the uniformity of the coating film of the coating liquid tend to be lowered.

However, in the titanium oxide aerogel particle according to the exemplary embodiment, a metal atom bonded to the surface of the base particle via an oxygen atom has a hydrocarbon group, and thus the dispersibility of the primary particle in the coating film is also secured. For this reason, it is possible to form a uniform coating film, and thereby light is efficiently applied to the titanium oxide aerogel particle, and the photocatalytic function is likely to be exerted. In addition, the transparency of the film and the like and the uniformity of the coating film of the coating liquid are also improved, and designability is also maintained. As a result, aggregation and coating defects of the titanium oxide aerogel particle are suppressed when a coating material containing the titanium oxide aerogel particle is applied to the surface of, for example, an outer wall material, a plate, a pipe, and a nonwoven fabric (a nonwoven fabric such as ceramics), and thereby the photocatalytic function tends to be exhibited for a long time period.

The titanium oxide aerogel particle according to the exemplary embodiment has the element ratio C/Ti of 0.3 to 1.5 on the surface, and in a case where the titanium oxide aerogel particle is irradiated with ultraviolet rays having the wavelength of 352 nm, and irradiation intensity of 1.3 mW/cm$^2$ for 20 hours, the reduction amount of the C/Ti on the surface of the titanium oxide aerogel particle before and after the irradiation with ultraviolet rays is preferably 0.01 to 0.3, is more preferably 0.02 to 0.25, and is particularly preferably 0.03 to 0.2 from the viewpoint of exhibiting high photocatalytic function in the visible light region.

In the titanium oxide aerogel particle according to the exemplary embodiment, in the case where the titanium oxide aerogel particle is irradiated with ultraviolet rays having the wavelength of 352 nm, and irradiation intensity of 1.3 mW/cm$^2$ for 20 hours, the reduction amount of the C/Ti on the surface of the titanium oxide aerogel particle before and after the irradiation with ultraviolet rays is 0.01 to 0.3. Although the reason for this is not clear, it is presumed that the titanium oxide aerogel particle in this embodiment has a porous structure so that the surface element C is not destroyed even when irradiated with ultraviolet rays and the structural change is reduced before and after the irradiation with ultraviolet rays.

From the viewpoint of exhibiting high photocatalytic function in the visible light region, the element ratio C/Ti on the surface of the titanium oxide aerogel particle is preferably 0.3 to 1.5, is more preferably 0.4 to 1.3, is still more preferably 0.5 to 1.2, and is particularly preferably 0.6 to 1.0.

The element ratio C/Ti on the surface of the titanium oxide aerogel particle is measured by the following method. At first, the measurement is performed on the titanium oxide aerogel particle to be measured by setting MgKα ray as an X-ray source, an accelerating voltage to be 10 kV, and an emission current to be 20 mA, by using an X-ray photoelectron spectroscopy (XPS) analyzer (JPS-9000 MX manufactured by JEOL Ltd.), and then the C/Ti is calculated from the strength of the each element peak.

The irradiation with ultraviolet rays on the surface of the titanium oxide aerogel particle is performed by being irradiated with ultraviolet rays at a wavelength of 352 nm and an irradiation intensity of 1.3 mW/cm$^2$. The temperature of the titanium oxide aerogel particle at the time of starting the irradiation with ultraviolet rays is set to be 15° C. to 30° C., and the irradiation time is set to be 20 hours.

After the irradiation with ultraviolet rays, the C/Ti is measured by using the above method, and the reduction amount of the C/Ti before and after the irradiation with ultraviolet rays is calculated.

The titanium oxide aerogel particle according to the exemplary embodiment is preferably a titanium oxide aerogel particle obtained by surface-treating the untreated titanium oxide aerogel particle with a metallic compound having a metal atom and a hydrocarbon group, and then oxidizing a portion of the hydrocarbon group by the heat treatment. In the present specification, the titanium oxide aerogel particle which is not surface-treated with the organometallic compound is referred to as "untreated titanium oxide aerogel particle". Further, the metallic compound having a metal atom and a hydrocarbon group is referred to as "organometallic compound".

[Untreated Titanium Oxide Aerogel Particle]

The untreated titanium oxide aerogel particle is a titanium oxide aerogel particle which is not surface-treated by the organometallic compound, and does not exclude other surface treatments. The untreated titanium oxide aerogel particle in the exemplary embodiment is preferably a titanium oxide aerogel particle which is neither surface-treated with the organometallic compound nor subjected to other surface treatments.

From the viewpoint of exhibiting high photocatalytic function, the untreated the BET specific surface area of the titanium oxide aerogel particle is preferably 120 m$^2$/g to 1000 m$^2$/g, is more preferably 150 m$^2$/g to 900 m$^2$/g, and is still more preferably 180 m$^2$/g to 800 m$^2$/g.

From the viewpoint of exhibiting high photocatalytic function, the untreated the average primary particle diameter of the titanium oxide aerogel particle is preferably 1 nm to 120 nm, is more preferably 5 nm to 100 nm, and is still more preferably 10 nm to 90 nm.

The volume average particle diameter of the untreated titanium oxide aerogel particle is preferably 0.1 μm to 3 μm, is more preferably 0.3 μm to 2.8 μm, and is still more preferably 0.5 μm to 2.5 μm.

The method of producing the untreated titanium oxide aerogel particle is not particularly limited, a sol-gel method using titanium alkoxide as a material is preferable from the viewpoint of controlling the range of the BET specific surface area in the above-described range. The titanium oxide aerogel particles produced by the sol-gel method form a porous particle (porous particle containing the titanium oxide) having a porous structure by aggregating the primary particles in the dispersion, and it is possible to exhibit the BET specific surface area to be within the above range.

The untreated titanium oxide aerogel particle is preferably formed of hydrolysis condensate of titanium alkoxide. Here, a portion of the alkoxy group of the titanium alkoxide may remain in the unreacted particles.

The untreated titanium oxide aerogel particle may contain a small amount of metal elements other than titanium such as silicon and aluminum. Note that, in a case of containing a silicon element, until the element ratio Si/Ti of silicon to titanium is equal to or less than 0.05, the influence of the titanium oxide aerogel particle on the effect of exhibiting a high photocatalytic function in the visible light region is small.

The crystal structure of the titanium oxide aerogel particle may be brookite type, anatase type, or rutile type, and may have these single crystal structures or may have a mixed crystal structure in which these are coexistent. The crystal structure of the titanium oxide aerogel particle can be controlled by adjusting the temperature of the heat treatment.

[Organometallic Compound]

The organometallic compound is bonded to the surface of the titanium oxide aerogel particle according to the exemplary embodiment via an oxygen atom. From the viewpoint that the organometallic compound is more likely to exhibit the visible light responsiveness, it is preferably a metallic compound formed of only a metal atom, a carbon atom, a hydrogen atom, and an oxygen atom.

From the viewpoint that the organometallic compound is more likely to exhibit the visible light responsiveness, the organometallic compound is bonded to the surface of the titanium oxide aerogel particle via an oxygen atom O directly bonded to a metal atom M in the organometallic compound, that is, the organometallic compound is preferably bonded to the surface of the titanium oxide acrogel particle by a covalent bond of M-O—Ti.

As the organometallic compound, an organometallic compound having a metal atom M and a hydrocarbon group directly bonded to the metal atom M is preferable from the viewpoint of more easily exhibiting the visible light responsiveness. The organometallic compound is preferably bonded to the surface of the titanium oxide aerogel particle via an oxygen atom O directly bonded to the metal atom M in the organometallic compound. That is, from the viewpoint of more easily exhibiting the visible light responsiveness, it is preferable that the surface of the titanium oxide aerogel particle has a structure in which a hydrocarbon group, a metal atom M, an oxygen atom O, and a titanium atom Ti are covalently bonded in sequence (a hydrocarbon group -M-O—Ti).

In a case where the organometallic compound has hydrocarbon groups, at least one hydrocarbon group is preferably directly bonded to the metal atom in the organometallic compound.

The chemical bond state between atoms in the organometallic compound can be known by performing high resolution analysis (narrow scan analysis) of XPS.

As the metal atom of the organometallic compound, silicon, aluminum or titanium is preferable, silicon or aluminum is more preferable, and silicon is particularly preferable.

Examples of the hydrocarbon group contained in the organometallic compound include a saturated or unsaturated aliphatic hydrocarbon group having 1 to 40 carbon atoms (preferably 1 to 20 carbon atoms, more preferably 1 to 18 carbon atoms, still more preferably 4 to 12 carbon atoms, further still more preferably 4 to 10 carbon atoms), and an aromatic hydrocarbon group having 6 to 27 carbon atoms (preferably 6 to 20 carbon atoms, more preferably 6 to 18 carbon atoms, still more preferably 6 to 12 carbon atoms, further still more preferably 6 to 10 carbon atoms).

The hydrocarbon group contained in the organometallic compound is preferably an aliphatic hydrocarbon group, is more preferably a saturated aliphatic hydrocarbon group, and is still more preferably an alkyl group, from the viewpoint of exhibiting high photocatalytic function and improvement of dispersibility. The aliphatic hydrocarbon group may be either linear, branched or cyclic, but is preferably linear or branched from the viewpoint of dispersibility. The number of carbon atoms of the aliphatic hydrocarbon group is preferably 1 to 20, is more preferably 1 to 18, is still more preferably 4 to 12, and is further still more preferably 4 to 10.

As the organometallic compound, a silane compound having a hydrocarbon group is particularly preferable. Examples of the silane compound contained in the hydrocarbon group include a chlorosilane compound, an alkoxysilane compound, a silazane compound (hexamethyl disilazane or the like).

As the silane compound having a hydrocarbon group used in the surface treatment of the titanium oxide aerogel particle, a compound represented by Formula (1): $R^1_n SiR^2_m$ is preferable from the viewpoint of exhibiting high photocatalytic function and improving the dispersibility.

In Formula (1): $R^1_n SiR^2_m$, $R^1$ represents a saturated or unsaturated aliphatic hydrocarbon group having 1 to 20 carbon atoms or an aromatic hydrocarbon group having 6 to 20 carbon atoms, $R^2$ represents a halogen atom or an alkoxy group, n represents an integer of 1 to 3, and m represents an integer of 1 to 3. Here, n+m=4. When n is an integer of 2 or 3, the plurality of $R^1$ may be the same groups or different groups. When m is an integer of 2 or 3, the plurality of $R^2$ may be the same groups or different groups.

The aliphatic hydrocarbon group represented by $R^1$ may be either linear, branched or cyclic, but is preferably linear or branched from the viewpoint of dispersibility. From the viewpoint of exhibiting high photocatalytic function and improvement of dispersibility, the number of carbon atoms of the aliphatic hydrocarbon group is preferably 1 to 20, is more preferably 1 to 18, is still more preferably 4 to 12, and is further still more preferably 4 to 10. The aliphatic hydrocarbon group may be either saturated or unsaturated; however, from the viewpoint of exhibiting high photocatalytic function and improvement of dispersibility, a saturated aliphatic hydrocarbon group is preferable, and an alkyl group is more preferable.

Examples of the saturated aliphatic hydrocarbon group include a linear alkyl group (such as a methyl group, an ethyl group, a propyl group, a butyl group, a pentyl group, a hexyl group, a heptyl group, an octyl group, a nonyl group, a decyl group, a dodecyl group, a hexadecyl group, and an icosyl group), a branched chain alkyl group (such as an isopropyl group, an isobutyl group, an isopentyl group, a neopentyl group, a 2-ethyl hexyl group, a tertiary butyl group, a tertiary pentyl group, and an isopentadecyl group), and a cyclic alkyl group (such as a cyclopropyl group, a cyclopentyl group, a cyclohexyl group, a cycloheptyl group, a cyclooctyl group, a tricyclodecyl group, a norbornyl group, and an adamantyl group).

Examples of the unsaturated aliphatic hydrocarbon group include an alkenyl group (such as a vinyl group (an ethenyl group), a 1-propenyl group, a 2-propenyl group, a 2-butenyl group, a 1-butenyl group, a 1-hexenyl group, a 2-dodecenyl group, and a pentenyl group), and an alkynyl group (such as an ethynyl group, a 1-propynyl group, a 2-propynyl group, a 1-butynyl group, a 3-hexynyl group, and a 2-dodecynyl group).

The aliphatic hydrocarbon group also includes a substituted aliphatic hydrocarbon group. Examples of the substituent that can be substituted with the aliphatic hydrocarbon group include a halogen atom, an epoxy group, a glycidyl group, a glycidoxy group, a mercapto group, a methacryloyl group, and an acryloyl group.

The aromatic hydrocarbon group represented by $R^1$ preferably has 6 to 20 carbon atoms, more preferably 6 to 18 carbon atoms, still more preferably 6 to 12 carbon atoms, and particularly preferably 6 to 10 carbon atoms.

Examples of the aromatic hydrocarbon group include a phenylene group, a biphenylene group, a terphenylene group, a naphthalene group, and an anthracene group.

The aromatic hydrocarbon group also includes a substituted aromatic hydrocarbon group. Examples of the substituent that can be substituted with the aromatic hydrocarbon group include a halogen atom, an epoxy group, a glycidyl group, a glycidoxy group, a mercapto group, a methacryloyl group, and an acryloyl group.

Examples of the halogen atom represented by $R^2$ include a fluorine atom, a chlorine atom, a bromine atom, and an iodine atom. The halogen atom is preferably a chlorine atom, a bromine atom, or an iodine atom.

Examples of the alkoxy group represented by $R^2$ include an alkoxy group having 1 to 10 carbon atoms (preferably 1 to 8 carbon atoms, and more preferably 3 to 8 carbon atoms). Examples of the alkoxy group include a methoxy group, an ethoxy group, an isopropoxy group, a t-butoxy group, a n-butoxy group, a n-hexyloxy group, a 2-ethyl hexyloxy group, and a 3,5,5-trimethyl hexyloxy group. The alkoxy group includes substituted alkoxy group. Examples of the substituent that can be substituted with the alkoxy group include a halogen atom, a hydroxyl group, an amino group, an alkoxy group, an amide group, and a carbonyl group.

From the viewpoint of exhibiting high photocatalytic function and improvement of dispersibility, the compound represented by Formula (1): $R^1_n SiR^2_m$ is preferably a compound in which $R^1$ is a saturated aliphatic hydrocarbon group. Particularly, in the compound represented by Formula (1): $R^1_n SiR^2_m$, $R^1$ is preferably a saturated aliphatic hydrocarbon group having 1 to 20 carbon atoms, $R^2$ is a halogen atom or an alkoxy group, n is an integer of 1 to 3, and m is an integer of 1 to 3. Here, n+m=4.

Examples of the compound represented by Formula (1): $R^1_n SiR^2_m$ include silane compounds such as vinyl trimethoxy silane, methyl trimethoxy silane, ethyl trimethoxy silane, propyl trimethoxy silane, butyl trimethoxy silane, hexyl trimethoxy silane, n-octyl trimethoxy silane, dicyl trimethoxy silane, dodecyl trimethoxy silane, vinyl triethoxy silane, methyl triethoxy silane, ethyl triethoxy silane, butyl triethoxy silane, hexyl triethoxy silane, decyl triethoxy silane, dodecyl triethoxy silane, phenyl trimethoxy silane, o-methyl phenyl trimethoxy silane, p-methyl phenyl trimethoxy silane, phenyl triethoxy silane, benzyl triethoxy silane, decyl trichlorosilane, and phenyl trichlorosilane (above, n=1, m=3); dimethyl dimethoxy silane, dimethyl diethoxy silane, methyl vinyl dimethoxy silane, methyl vinyl diethoxy silane, diphenyl dimethoxy silane, diphenyl diethoxy silane, dimethyl dichlorosilane, and dichlorodiphenyl silane (above, n=2, m=2); trimethyl methoxy silane, trimethyl ethoxy silane, trimethyl chlorosilane, decyl dimethyl chlorosilane, and triphenyl chlorosilane (above, n=3, m=1); 3-glycidoxy propyl trimethoxy silane, γ-methacryloxy propyl trimethoxy silane, γ-mercaptopropyl trimethoxy silane, γ-chloropropyl trimethoxy silane, γ-aminopropyl trimethoxy silane, γ-aminopropyl triethoxy silane, γ-(2-aminoethyl) aminopropyl trimethoxy silane, γ-(2-aminoethyl) aminopropyl methyl dimethoxy silane, and γ-glycidyloxy propyl methyl dimethoxy silane (above, compounds in which $R^1$ is a substituted aliphatic hydrocarbon group or a substituted aromatic hydrocarbon group). The silane compound may be used alone or two or more kinds thereof may be used in combination.

The hydrocarbon group in the silane compound represented by Formula (1) is preferably an aliphatic hydrocarbon group, is more preferably a saturated aliphatic hydrocarbon group, and is particularly preferably an alkyl group, from the viewpoint of exhibiting high photocatalytic function and improvement of dispersibility. The hydrocarbon group in the silane compound is preferably a saturated aliphatic hydrocarbon group having 1 to 20 carbon atoms, is more preferably a saturated aliphatic hydrocarbon group having 1 to 18 carbon atoms, is still more preferably a saturated aliphatic hydrocarbon group having 4 to 12 carbon atoms, and is particularly preferably a saturated aliphatic hydrocarbon group having 4 to 10 carbon atoms, from the viewpoint of exhibiting high photocatalytic function and improvement of dispersibility.

Examples of the compound in which the metal atom of the organometallic compound is aluminum include aluminum chelate such as di-i-propoxy aluminum ethylacetoacetate; and an aluminate-based coupling agent such as acetoalkoxy aluminum diisopropylate.

Examples of the compound in which the metal atom of the organometallic compound is titanium include a titanate-based coupling agent such as isopropyl triisostearoyl titanate, tetraoctyl bis(ditridecyl phosphite) titanate, and bis(dioctyl pyrophosphate) oxyacetate titanate; and titanium chelate such as di-i-propoxybis(ethylacetoacetate) titanium, di-i-propoxybis(acetylacetonato) titanium, di-i-propoxybis (triethanolaminate) titanium, di-i-propoxytitanium diacetate, di-i-propoxy titanium dipropionate.

The organometallic compound may be used alone or two or more kinds thereof may be used in combination.

The titanium oxide aerogel particle having a surface on which the organometallic compound is bonded exhibits high photocatalytic function even in the visible light region, and is advantageous from the viewpoints described below.

Generally, the titanium oxide aerogel particle has poor dispersibility in the resin or the solvent, and thus it is likely that the uniformity of the coating film including the titanium oxide aerogel particle is low and the photocatalytic function cannot be exerted. In contrast, the titanium oxide aerogel particle having a surface on which the organometallic compound is bonded has a hydrocarbon group derived from the organometallic compound on the surface, and thus has excellent dispersibility in the resin or the solvent. As a result, it is possible to form a uniform coating film including the titanium oxide aerogel particle, and thereby light is efficiently applied to the titanium oxide aerogel particle, and the photocatalytic function is likely to be exerted. In addition, aggregation and coating defects of the titanium oxide aerogel particle are suppressed when a coating material containing the titanium oxide aerogel particle is applied to the surface of, for example, an outer wall material, a plate, a pipe, and a nonwoven fabric, and thereby the photocatalytic function tends to be exhibited for a long time period.

In addition, the titanium oxide aerogel particle according to the exemplary embodiment preferably contains amorphous carbon from the viewpoint of the photocatalytic function in the visible light region. For example, amorphous carbon is produced by the treatment of heating or the like of the titanium oxide aerogel particle which is surface-treated with a metal-containing compound having a hydrocarbon group to oxidatively decompose a portion of the hydrocarbon group in the metal-containing compound. In such a titanium oxide aerogel particle, it is considered that a hydrocarbon group, a substance obtained by oxidizing the hydrocarbon group, and amorphous carbon obtained by carbonizing the hydrocarbon group are present in the fine pores of the titanium oxide aerogel particle, that is, a hydrocarbon group, a substance obtained by oxidizing the hydrocarbon group, and amorphous carbon obtained by carbonizing the hydrocarbon group are incorporated from the surface layer to the inside of the titanium oxide aerogel particle.

On the other hand, it is considered that the incorporated amorphous carbon has light absorption of visible light and UV light, and functions as a charge separation substance and a cocatalyst.

<Method of Producing Titanium Oxide Aerogel Particle>

The method of producing the titanium oxide aerogel particle according to the exemplary embodiment is not particularly limited. For example, the porous particles containing the titanium oxide are obtained by the sol-gel method, and the titanium oxide aerogel particles according to the exemplary embodiment are obtained by surface-treating of the porous particles with the organometallic compound. In this case, the porous particles may be heat-treated after the surface treatment, and the porous particles after the heat treatment may be set as the titanium oxide aerogel particles according to the exemplary embodiment.

Hereinafter, an example of a method of producing the titanium oxide aerogel particle according to the exemplary embodiment will be described.

The method of producing the titanium oxide aerogel particle preferably contains at least the followings (1), (2), (3), and (4). (1) A step of granulating porous particles containing titanium oxide by a sol-gel method so as to prepare a dispersion containing the porous particles and a solvent (dispersion preparation step). (2) A step of removing the solvent from the dispersion using supercritical carbon dioxide (solvent removal step). (3) A step of surface-treating the porous particles after removing the solvent with a metallic compound having a metal atom and a hydrocarbon group (surface treatment step). The surface treatment step may be performed in the supercritical carbon dioxide. (4) A step of heat-treating the porous particles after the surface treatment (heat treatment step).

[(1) Dispersion Preparation Step]

The dispersion preparation step is a step of generating titanium oxide by causing a reaction of the titanium alkoxide (hydrolysis and condensation) by using the titanium alkoxide as a material so as to obtain a dispersion in which porous particles containing the titanium oxide are dispersed in a solvent.

Specifically, the dispersion preparation step is, for example, the following step. A titanium alkoxide is added to alcohol, an acid aqueous solution is dropped thereinto under stirring, and titanium alkoxide is reacted to generate the titanium oxide so as to obtain a dispersion in which porous particles containing titanium oxide are dispersed in alcohol (porous particle dispersion).

Here, it is possible to control the primary particle diameter of the porous particles by the additive amount of the titanium alkoxide in the dispersion preparation step. The primary particle diameter of the porous particles is small as the additive amount of the titanium alkoxide is large. The mass ratio of the titanium alkoxide to alcohol is preferably 0.04 to 0.65, and is more preferably 0.1 to 0.5. Specifically, the additive amount of the titanium alkoxide is preferably 4 parts by mass to 65 parts by mass, and is more preferably 10 parts by mass to 50 parts by mass, with respect to 100 parts by mass of alcohol.

Examples of the titanium alkoxide used in the dispersion preparation step include tetraalkoxy titanium such as tetramethoxy titanium, tetraethoxy titanium, tetrapropoxy titanium, and tetrabutoxy titanium, and alkoxy titanium chelate obtained by chelating titanium by a portion of an alkoxy group, such as di-i-propoxy bis(ethyl acetate) titanium and di-i-propoxy bis(acetylacetonate) titanium. These may be used alone or two or more kinds thereof may be used in combination. Note that, the titanium oxide aerogel particle may contain a small amount of metal elements other than titanium such as silicon and aluminum. In this case, tetraalkoxy silane such as tetramethoxy silane, tetraethoxy silane, tetrapropoxy silane, and tetrabutoxy silane; alkyl trialkoxy silanes such as methyl trimethoxy silane, methyl triethoxy silane, and ethyl triethoxy silane; alkyl dialkoxy silane such as dimethyl dimethoxy silane and dimethyl diethoxy silane; aluminum alkoxide such as aluminum isopropoxide may be used. In a case of containing a silicon element, the element ratio Si/Ti of silicon to titanium may be set in a range of 0 to 0.05.

Examples of the alcohol used in the dispersion preparation step include methanol, ethanol, propanol, and butanol. These may be used alone or two or more kinds thereof may be used in combination.

Examples of the acid in the acid aqueous solution used in the dispersion preparation step include oxalic acid, acetic acid, hydrochloric acid, and nitric acid. An acid concentration of the acid aqueous solution is preferably 0.001% by mass to 1% by mass, and is more preferably 0.005% by mass to 0.01% by mass.

A drop amount of the acid aqueous solution in the dispersion preparation step is preferably 0.001 parts by mass to 0.1 parts by mass, with respect to 100 parts by mass of the titanium alkoxide.

The porous particle dispersion obtained in the dispersion preparation step has a solid content concentration which is preferably 1% by mass to 30% by mass.

[(2) Solvent Removal Step]

The solvent removal step is a step of removing a solvent by bringing supercritical carbon dioxide into contact with a dispersion containing a porous particle and the solvent. A solvent removal treatment with supercritical carbon dioxide is less prone to collapse or blockage of pores of porous particles as compared with a solvent removal treatment by heating. Since the solvent removal step is a step of removing the solvent with supercritical carbon dioxide, the titanium oxide aerogel particle having a BET specific surface area of 120 $m^2/g$ or more can be obtained.

Specifically, the solvent removal step is performed, for example, by the following operation. The porous particle dispersion is introduced into a sealed reactor, subsequently liquefied carbon dioxide is introduced, and then the sealed reactor is heated and the inside thereof is pressurized with a high-pressure pump so as to convert carbon dioxide in the sealed reactor into a supercritical state. By introducing the liquefied carbon dioxide into the sealed reactor and discharging the supercritical carbon dioxide out of the sealed reactor, the supercritical carbon dioxide flows through the porous particle dispersion in the sealed reactor. While the supercritical carbon dioxide flows through the porous particle dispersion, the solvent dissolves into the supercritical carbon dioxide, and the solvent is removed accompanying supercritical carbon dioxide discharging out of the sealed reactor.

The temperature and pressure in the sealed reactor are a temperature and a pressure at which carbon dioxide is in a supercritical state. For example, when the critical point of carbon dioxide is 31.1° C./7.38 MPa, the temperature is set to be 50° C. to 200° C. and the pressure is set to be 10 MPa to 30 MPa.

[(3) Surface Treatment Step]

A surface treatment step is a step of reacting a metallic compound having a metal atom and a hydrocarbon group (in the present disclosure, referred to as an "organometallic compound") with the surface of the porous particle. In the surface treatment step, a reactive group (for example, a hydrolyzable group such as a halogeno group and an alkoxy group) in the organometallic compound and a reactive group (for example, a hydroxyl group) present on the surface of the porous particle react with each other so that the surface treatment is performed on the porous particle. The surface treatment step is performed under an atmosphere or under a nitrogen atmosphere. However, when the surface treatment step is performed in the supercritical carbon dioxide, the organometallic compound reaches deep into the fine pores of the porous particles and surface treatment is performed deep into the fine pores of porous particles. Therefore, the surface treatment is preferably performed in the supercritical carbon dioxide.

The surface treatment is performed by, for example, a method of mixing and reacting the organometallic compound with the porous particle in the supercritical carbon dioxide under stirring, or a method of preparing a treatment liquid obtained by mixing the organometallic compound and the solvent, and then mixing the porous particle and the treatment liquid in the supercritical carbon dioxide under stirring. In order to maintain the pore structure of the porous particle and to obtain a high BET specific surface area, method in which the organometallic compound is subsequently introduced into the supercritical carbon dioxide after the completion of the solvent removal step of (2) and the organometallic compound reacts with the surface of the porous particle in the supercritical carbon dioxide is preferable.

The temperature and pressure in the surface treatment step are a temperature and a pressure at which carbon dioxide is in a supercritical state. For example, the surface treatment step is performed in an atmosphere of a temperature of 50° C. to 200° C., and a pressure of 10 MPa to 30 MPa. The reaction time is preferably 10 minutes to 24 hours, is more preferably 20 minutes to 120 minutes, and is even more preferably 30 minutes to 90 minutes.

The organometallic compound used in the surface treatment is as described above.

The solvent in the case of using the treatment liquid obtained by mixing the organometallic compound and the solvent is not particularly limited as long as it is compatible with the organometallic compound, and organic solvents such as alcohols such as methanol, ethanol, propanol and butanol; toluene, ethyl acetate and acetone are preferably used.

In the treatment liquid, the amount of the organometallic compound is preferably 10 parts by mass to 200 parts by mass, is more preferably 20 parts by mass to 180 parts by mass, and is even more preferably 50 parts by mass to 150 parts by mass, with respect to 100 parts by mass of the solvent.

The amount of the organometallic compound used in the surface treatment is preferably 10 parts by mass to 200 parts by mass, is more preferably 20 parts by mass to 180 parts by mass, and is even more preferably 30 parts by mass to 150 parts by mass, with respect to 100 parts by mass of the porous particles. When the amount of the organometallic compounds is set to be equal to or greater than 10 parts by mass, a high photocatalytic function is easily exhibited even in the visible light region, and the dispersibility is also increased. When the amount of the organometallic compound is set to be equal to or less than 200 parts by mass, present on the surface of the porous particle, excessive amount of carbon derived from the organometallic compound, present on the surface of the porous particle, is suppressed and deterioration of the photocatalytic function due to excess carbon is suppressed.

After the surface treatment, it is preferable to perform a drying treatment for the purpose of removing residues such as excess organometallic compounds and the solvent of the treatment liquid. As the drying treatment, known methods such as a spray drying method and a shelf drying method can be used, but a step of removing the solvent from the dispersion containing the porous particles using the supercritical carbon dioxide is preferable, and a step of removing the solvent in supercritical carbon dioxide subsequently after the completion of the surface treatment step is more preferable. The specific operation may be the same as the operation described in the above (2).

[(4) Heat Treatment Step]

With the heat treatment step, the photocatalytic function of the titanium oxide aerogel particle in the visible light is further improved. Although the detailed mechanism is unknown, it is considered that when a portion of the hydrocarbon group of the organometallic compound bonded to the surface and the fine pore is oxidized or carbonized by heat treatment, the titanium oxide aerogel particle has an absorption to visible light and the photocatalytic function is exhibited by performing a photocharge separation function even when visible light is absorbed besides UV light. This indicates that the titanium oxide aerogel particle has absorption at wavelengths of 450 nm and 750 nm in a visible absorption spectrum. That is, an action of selectively capturing electrons by light absorption of the visible light besides the UV light works by a portion of oxidized or carbonized hydrocarbon or carbonized carbon present on the surface and in the fine pore of the titanium oxide aerogel particle. As a result, it is inferred that the probability of recombination of electrons and holes generated by light absorption is lowered, the charge separation is efficiently promoted, and thereby the visible light responsiveness of the titanium oxide aerogel particle is enhanced by promoting this charge separation.

The temperature of the heat treatment is preferably 180° C. to 500° C., is more preferably 200° C. to 450° C., and is still more preferably 250° C. to 400° C., from the viewpoint of improving the photocatalytic function. The time of the heat treatment is preferably 10 minutes to 24 hours, is more preferably 20 minutes to 300 minutes, and is still more preferably 30 minutes to 120 minutes, from the viewpoint of improving the photocatalytic function When the temperature of the heat treatment is set to be 180° C. to 500° C., it is possible to efficiently obtain the titanium oxide aerogel particle which exhibits high photocatalytic function even in the visible light region. When the heat treatment is performed in a range of 180° C. to 500° C., it is inferred that a hydrocarbon group derived from the organometallic compound, present on the surface of the titanium oxide aerogel particle, is appropriately oxidized, and a portion of a C—C bond or the like of the hydrocarbon group is changed to a C—O bond or a C═O bond.

The heat treatment is preferably performed at an atmosphere of oxygen concentration of 1% to 21% (% by volume). By performing the heat treatment in this oxygen atmosphere, oxidation of the hydrocarbon group derived from the organometallic compound present on the surface of the titanium oxide aerogel particle can be appropriately and efficiently performed. The oxygen concentration (% by volume) is more preferably 3% to 21%, and is still more preferably 5% to 21%.

The method of the heat treatment is not particularly limited, and examples thereof include a heating method with an electric furnace, a sintering furnace (roller hearth kiln, shuttle kiln, and the like), a radiant heating oven, a hot plate or the like; and a heating method with laser light, infrared rays, UV, and microwave.

Through the above steps, the titanium oxide aerogel particle according to the exemplary embodiment can be obtained.

<Photocatalyst Forming Composition>

The photocatalyst forming composition according to the exemplary embodiment includes the titanium oxide aerogel particle according to the exemplary embodiment, and at least one compound selected from the group consisting of a dispersion medium and a binder.

Examples of the photocatalyst forming composition according to the exemplary embodiment include the titanium oxide aerogel particle according to the exemplary embodiment, and a dispersion containing a dispersion medium; the titanium oxide aerogel particle according to the exemplary embodiment and a composition containing an organic or inorganic binder. The dispersion may be in the form of a paste having a high viscosity.

As the dispersion medium, water, an organic solvent, and the like are preferably used. Examples of water include tap water, distilled water, and pure water. The organic solvent is not particularly limited, and examples thereof include a hydrocarbon solvent, an ester solvent, an ether solvent, a halogen solvent, and an alcohol solvent. From the viewpoints of dispersion stability and storage stability, the dispersion preferably contains at least one compound selected from the group consisting of a dispersant and a surfactant. Known chemical substances are used as the dispersant and the surfactant. The dispersion may contain a binder as an emulsion.

The binder to be used in the composition is not particularly limited, and examples thereof include an organic binder such as a fluororesin, a silicone resin, a polyester resin, an acrylic resin, a styrene resin, an acrylonitrile/styrene copolymer resin, an acrylonitrile/butadiene/styrene copolymer (ABS) resin, an epoxy resin, a polycarbonate resin, a polyamide resin, a polyamine resin, a polyurethane resin, a polyether resin, a polysulfide resin, a polyphenol resin, and a compound thereof; and an organic binder such as a resin obtained by silicone-modifying or halogen-modifying the above resins; and an inorganic binder such as glass, ceramic, metal powder, cement, gypsum, and diatomaceous earth.

The photocatalyst forming composition according to the exemplary embodiment may contain other components. As other components, known additives are used, and examples thereof include a cocatalyst, a colorant, a filler, a preservative, a defoaming agent, an adhesion improver, and a thickener.

The photocatalyst forming composition according to the exemplary embodiment may contain one or two or more kinds of the titanium oxide aerogel particles according to the exemplary embodiment.

The content of the titanium oxide aerogel particle according to the exemplary embodiment in the photocatalyst forming composition according to the exemplary embodiment is not particularly limited, and is properly selected in accordance with various forms of a dispersion and a resin composition, and a desired amount of the photocatalyst.

The method of producing the photocatalyst using the photocatalyst forming composition according to the exemplary embodiment or producing the structure body having the photocatalyst is not particularly limited, and known applying methods are used. Examples of the applying method of the photocatalyst forming composition according to the exemplary embodiment include a spin coating method, a dip coating method, a flow coating method, a spray coating method, a roll coating method, a brush coating method, a sponge coating method, a screen printing method, and an ink jet printing method.

<Photocatalyst and Structure Body>

The photocatalyst according to the exemplary embodiment contains the titanium oxide aerogel particle according to the exemplary embodiment or is formed of the titanium oxide aerogel particle according to the exemplary embodiment. The structure body according to the exemplary embodiment has the titanium oxide aerogel particle according to the exemplary embodiment.

The photocatalyst according to the exemplary embodiment may be a photocatalyst formed of the titanium oxide aerogel particle according to the exemplary embodiment, may be a photocatalyst obtained by mixing a cocatalyst in the titanium oxide aerogel particle according to the exemplary embodiment, or may be a photocatalyst obtained by solidifying the titanium oxide aerogel particle according to the exemplary embodiment in a predetermined shape with an adhesive or a pressure sensitive adhesive.

The structure body according to the exemplary embodiment preferably has the titanium oxide aerogel particle according to the exemplary embodiment, as a photocatalyst. From the viewpoint of the photocatalyst activity, the structure body according to the exemplary embodiment preferably has the titanium oxide aerogel particle according to the exemplary embodiment at least on the surface.

The structure body according to the exemplary embodiment may be a structure body containing the titanium oxide aerogel particle according to the exemplary embodiment on at least a portion of the base material surface, or may be structure body formed by applying the photocatalyst forming composition according to the exemplary embodiment to at least a portion of the base material surface. In the structure body, the application amount of the photocatalyst forming composition according to the exemplary embodiment is not particularly limited, and may be selected as desired.

In the structure body according to the exemplary embodiment, the titanium oxide aerogel particle according to the exemplary embodiment may be fixed even in a state of being attached to the surface of the base material, and from the viewpoint of the durability of the photocatalyst, it is preferable to be fixed. The fixing method is not particularly limited, and a known fixing method is used.

The base material used in the exemplary embodiment may be various materials regardless of inorganic materials and organic materials, and the shape thereof is also not limited. Preferred examples of the base material include metal, ceramic, glass, plastic, rubber, stone, cement, concrete, fiber, cloth, wood, paper, a combination of aforementioned base materials, a laminate of the aforementioned base materials, and a product having at least one layer of a coating film on the surface of the aforementioned base materials. Preferable examples of the base material seen from the viewpoint of usage, exterior and coating such as building materials, exterior materials, window frames, window glasses, mirrors, tables, dishes, curtains, lenses, prisms, and vehicle, exterior of machine equipment, exterior of goods, cover and coating of dustproof, exterior and coating of traffic signs, various display devices, advertising towers, sound insulation walls for roads, sound insulation walls for railroads, bridges and guardrails, interior and coating of tunnel, insulators, solar cell covers, solar water heater heat collecting covers, polymer films, polymer sheets, filters, indoor signboards, outdoor signboards, cover for vehicular illumination lamps, outdoor lighting equipment, air purifiers, water purifiers, medical instruments, and nursing care products.

EXAMPLES

Hereinafter, embodiments of the present invention will be described in detail with reference to examples, but the embodiments of the invention are not limited to these examples at all. In the following description, all "parts" are on a mass basis unless otherwise specified.

Example 1

[Dispersion Preparation Step]

In a reaction vessel, 115.4 parts of methanol and 14.3 parts of tetrabutoxy titanium are charged and mixed. While stirring the mixture at 100 rpm with a magnetic stirrer, 7.5 parts of 0.009% by mass of oxalic acid aqueous solution is added dropwise over 30 seconds. The mixture is kept for 30 minutes while stirring so as to obtain 137.2 parts (solid content: 3.4 parts, liquid phase content: 133.9 parts) of dispersion (1).

[Solvent Removal Step]

137.2 parts of dispersion (1) is charged into the reaction tank, $CO_2$ is added while stirring at 85 rpm, and the temperature and pressure are raised to 150° C. and 20 MPa. While stirring, $CO_2$ is introduced into and discharged out of the reaction tank, and 132 parts of the liquid phase is removed over 60 minutes.

[Surface Treatment Step]

A mixture of 3.4 parts of isobutyl trimethoxy silane and 3.4 parts of methanol are added over five minutes to a solid phase remaining after removing the liquid phase, and kept at 150° C./20 MPa for 30 minutes while stirring at 85 rpm. While stirring, $CO_2$ is introduced into and discharged out of the reaction tank, and 6.5 parts of the liquid phase is removed over 30 minutes. The pressure is reduced to atmospheric pressure over 30 minutes, and 4.0 parts of powder is collected.

[Heat Treatment Step]

0.5 part of the powder is weighed in a SUS container and subjected to a heat treatment at 380° C. for 60 minutes in an electric furnace in which the oxygen concentration (% by volume) s set to 20%, and allowed to cool down to 30° C., and then 0.5 part of powder (titanium oxide aerogel particle) is collected.

Examples 2 to 21, Comparative Examples 1A to 7A

Each of the titanium oxide aerogel particles is produced in the same manner as in Example 1 except that materials or treatment conditions are changed as indicated in Tables 1 to 3.

Comparative Example 1B

Commercially available anatase-type titanium oxide particle ("SSP-20 (produced by SAKAI CHEMICAL INDUSTRY CO., LTD.)") is set as a titanium oxide particle.

Comparative Example 2B

A heat treatment is performed on the commercially available anatase-type titanium oxide particle ("SSP-20 (produced by SAKAI CHEMICAL INDUSTRY CO., LTD.)") at 380° C. for one hour in an electric furnace, and thereby a titanium oxide particle is obtained.

Comparative Example 3B

35% by mass of hexyl trimethoxy silane with respect to titanium oxide particle is added dropwise to a dispersion in which the commercially available anatase-type titanium oxide particle ("SSP-20 (produced by SAKAI CHEMICAL INDUSTRY CO., LTD.)") is dispersed in methanol, reacted at 40° C. for one hour, and spray-dried at an outlet temperature of 120° C. so as to obtain dry powder.

Example 22

[Dispersion Preparation Step]

In a reaction vessel, 115.4 parts of methanol and 14.3 parts of tetrabutoxy titanium are charged and mixed. While stirring the mixture at 100 rpm (rotation/minute) with a magnetic stirrer, 7.5 parts of 0.009% by mass of oxalic acid aqueous solution is added dropwise over 30 seconds. The mixture is kept for 30 minutes while stirring so as to obtain 137.2 parts (solid content: 3.4 parts, liquid phase content: 133.9 parts) of dispersion (1).

[Solvent Removal Step]

137.2 parts of dispersion (1) is charged into the reaction tank, $CO_2$ is added while stirring at 85 rpm, and the temperature and pressure are raised to 150° C. and 20 MPa. While stirring, $CO_2$ is introduced into and discharged out of the reaction tank, and 132 parts of the liquid phase is removed over 60 minutes.

[Surface Treatment Step]

A mixture of 3.4 parts of isobutyl trimethoxy silane and 3.4 parts of methanol are added over five minutes to a solid phase remaining after removing the liquid phase, and kept at 150° C./20 MPa for 30 minutes while stirring at 85 rpm. While stirring, $CO_2$ is introduced into and discharged out of the reaction tank, and 8.5 parts of the liquid phase is removed over 30 minutes. The pressure is reduced to atmospheric pressure over 30 minutes, and 3.7 parts of powder is collected.

[Heat Treatment Step]

0.5 part of the powder is weighed in a SUS container and the SUS container is placed on a hot plate. The temperature is raised up to 380° C., and kept for 60 minutes, and allowed to cool down to 30° C., and then 0.5 part of powder (titanium oxide aerogel particle) is collected.

Comparative Examples 8 to 14, and Examples 23 to 42

Each of the titanium oxide aerogel particles is produced in the same manner as in Example 22 except that materials or treatment conditions are changed as indicated in Tables 1 or 2.

Comparative Example 15

Commercially available anatase-type titanium oxide particle (SSP-20 produced by SAKAI CHEMICAL INDUSTRY CO., LTD., volume average particle diameter of 12 nm) is set as a titanium oxide particle.

Comparative Example 16

A heat treatment is performed on the commercially available anatase-type titanium oxide particle (SSP-20 produced by SAKAI CHEMICAL INDUSTRY CO., LTD., volume average particle diameter 12 nm) at 400° C. for 60 minutes in an electric furnace, and thereby a titanium oxide particle is obtained.

Comparative Example 17

100% by mass of isobutyl trimethoxy silane with respect to titanium oxide aerogel particle is added dropwise to a dispersion of the commercially available anatase-type titanium oxide particle (SSP-20, produced by SAKAI CHEMICAL INDUSTRY CO., LTD., volume average particle diameter of 12 nm) dispersed in methanol. The mixture is reacted at 40° C. for one hour, and spray-dried at an outlet temperature of 120° C. so as to obtain a titanium oxide particle.

<Measurement of Physical Properties of Particles>

The physical properties of the particles obtained in each example are measured according to the following measurement method. The results are indicated in Tables 1 to 7. In Tables 1 to 4, GSDv is a volume particle size distribution of particles, and "UV-Vis characteristics" are absorbances at wavelengths of 450 nm, 600 nm and 750 nm, respectively, when the absorbance at wavelengths of 350 nm is set to be 1. Note that, the primary particle diameter and the particle diameter of the titanium oxide aerogel particle formed by aggregating the primary particles are set as particle diameters of the particles illustrated in the FIGURE. That is, the primary particle diameter of the titanium oxide aerogel particle is a particle diameter of the particle constituting the titanium oxide aerogel particle, and the particle diameter of the titanium oxide aerogel particle is a secondary particle diameter obtained by aggregating the primary particles.

[BET Specific Surface Area]

By using "MACSORB HM model 1201 type" manufactured by Mountech Co., Ltd. as a specific surface area measuring apparatus, 50 mg of sample is pretreated at 30° C. for 120 minutes for degassing so as to obtain a BET specific surface area by a BET multipoint method using nitrogen gas with purity of 99.99% or more.

[Average Primary Particle Diameter]

An average diameter of the primary particles is measured as follows. With respect to 100 parts by mass of resin particles (styrene-butyl acrylate copolymer particles (copolymerization ratio (mass ratio)=80:20, weight average molecular weight Mw=130,000, glass transition temperature Tg=59° C.) having a volume average particle diameter of 8 μm, 1.0 part by mass of titanium oxide aerogel particles are mixed and blended at 13000 rpm for two minutes by using a sample mill (model SK-M2 type) (manufactured by Kyoritsu-riko.co.jp.). The titanium oxide aerogel particle after being dispersed in the resin particle is observed by using a scanning electron microscope (SEM) apparatus (S-4100 manufactured by Hitachi, Ltd.), and images are captured. This images are taken into an image analyzing apparatus (LUZEX II, manufactured by Nireco Corporation), each area for each primary particle is measured by analyzing each image of primary particle. Each circle equivalent diameter is calculated from each area, and an average of the circle equivalent diameter is set as an average diameter of the primary particles. In the electron microscope, the magnification at which the primary particles can be analyzed is adjusted, and about 10 to 50 primary particles are analyzed, and the average primary particle diameter is obtained. In the determination of the primary particle diameter, as illustrated in the FIGURE, particles aggregating to form the titanium oxide aerogel particles are defined as primary particles and subjected to image analysis.

[Volume Average Particle Diameter]

A volume average particle diameter is measured as follows. With respect to 100 parts by mass of resin particles (styrene-butyl acrylate copolymer particles (copolymerization ratio (mass ratio)=80:20, weight average molecular weight Mw=130,000, glass transition temperature Tg=59° C.) having a volume average particle diameter of 8 μm, 1.0 part by mass of titanium oxide aerogel particles are mixed and blended at 13000 rpm for two minutes by using a sample mill (model SK-M2 type) (manufactured by Kyoritsu-riko.co.jp.). 0.1 g of titanium oxide-containing resin particles after blending is put into a beaker, and 1.5 g of an aqueous surfactant solution in which 12% anionic surfactant (TAYCA POWER BN 2060, manufactured by Tayca Corporation) is diluted with ion exchanged water is added, 5 g of pure water is added after sufficiently wetting the particles, followed by dispersing the particles in an ultrasonic disperser for 30 minutes, and then the resin particles are removed with SC filter paper so as to obtain a titanium oxide aerogel particle dispersion. The volume average particle diameter of the titanium oxide aerogel particle in the titanium oxide aerogel particle dispersion is obtained by measuring with NANOTRAC UPA-ST (a dynamic light scattering type particle size measuring device manufactured by MicrotracBEL Corp.). Specifically, a cumulative distribution is drawn from the small diameter side for the volume of individual particles in the particle size range (channel) to which the particle size distribution is divided, and the particle diameter having cumulative of 50% is obtained as the volume average particle diameter (particle diameter of D50v).

[Volume Particle Size Distribution]

The volume particle size distribution is measured as follows. The volume particle size distribution is measured by using the same manner as that of the volume average particle diameter in such a manner that a cumulative distribution is drawn from the small diameter side for the volume of individual particles in the particle size range (channel) to which the particle size distribution is divided, a square root of a quotient obtained by dividing the particle diameter of D90v having cumulative of 90% by particle diameter of D10v having cumulative of 10% is defined as a volume particle size distribution (GSDv). That is, the volume particle size distribution $(GSDv)=(D90v/D10v)^{0.5}$ is established.

[UV Visible Absorption Spectrum]

The particles obtained in the respective examples are dispersed in tetrahydrofuran, then applied onto a glass substrate, and the applied glass substrate is dried at 24° C. in the atmosphere. By using a spectrophotometer U-4100 (manufactured by Hitachi High-Technologies Corporation) under the setting of a scan speed: 600 nm, a slit width: 2 nm, and a sampling interval: 1 nm, a diffuse reflection spectrum in a wavelength range of 200 nm to 900 nm is measured in a diffuse reflection arrangement. The absorbance at each wavelength is theoretically obtained from the diffuse reflection spectrum by Kubelka-Munk transformation so as to obtain a UV visible absorption spectrum.

The titanium oxide aerogel particles of Examples 1 to 42 had absorption in the entire wavelength range of 400 nm to 800 nm.

[Element Ratio C/Ti]

The element ratio C/Ti on the particle surface by XPS is measured by following the conditions below before and after irradiation with ultraviolet rays having a wavelength of 352 nm and an irradiation intensity of 1.3 mW/cm² at 25° C. for 20 hours on the particle surface obtained in each example, and the reduction amount of the element ratio C/Ti before and after irradiation with the ultraviolet ray is calculated.

<Evaluation of Particle Performance>

[Gas Adsorptivity and Gas Decomposability]

As the activity of the particle obtained in each example, the gas adsorptivity and the gas decomposability by irradiation with visible light are evaluated. The results are indicated in Table 1.

The particles obtained in each example are dispersed in methanol so that the solid content concentration is 4% by mass. 0.25 g of the dispersion is applied to half of the glass plate for microscope (area 10 cm²), and then sufficiently dried so as to produce a test piece in which particles are uniformly attached to the half of the surface of the glass plate. Two test pieces are produced for each particle of each example.

Immediately after producing the test piece, each test piece is put into a TEDLAR bag with one mouth cock having capacity of 1 L (one test piece is put in one TEDLAR bag), air inside the TEDLAR bag is pushed out and the TEDLAR bag is sealed, then the TEDLAR bag is placed in the dark place with the coated side of the glass plate facing up, and stored until the performance evaluation test.

The performance evaluation test is performed in the following procedure. First, the residual air in the inside is all discharged with an aspirator from the cock of the TEDLAR bag containing each test piece, and then 800 ml of ammonia gas at 100 ppm is injected. Next, one of two TEDLAR bags containing the same types of test piece is continuously irradiated with visible light (6,000 LX (lux) on the surface of the test piece) by using a light emitting diode (LED) that irradiates the visible light at a wavelength in a range of 400 nm to 800 nm. The other one of the two TEDLAR bags containing the same types of test pieces is placed in a dark box which protects from the light, and kept for one hour. Ammonia gas concentration in a TEDLAR bag containing the test piece after one hour continuous irradiation with visible light, and ammonia gas concentration in a TEDLAR bag containing test pieces kept in dark box for one hour, are measured using a detection tube (manufactured by GASTEC CORPORATION). Then, from the following formula, an index $\Delta A$ of ammonia gas adsorptivity and an ammonia gas decomposition rate $\Delta S$ by irradiation with visible light are obtained.

S1=Ammonia gas concentration (ppm) in Tedlar bag after one hour continuous irradiation with visible light S2=Ammonia gas concentration (ppm) in Tedlar bag after storage in a dark box for one hour Indication $\Delta A$(ppm) of ammonia gas adsorptivity=100−S2

Ammonia gas decomposition rate $\Delta S$ (%)= (S2−S1)/S2×100

From the above values, the gas adsorptivity and the gas decomposability are evaluated as follows.

—Gas Adsorptivity—

G1 (A): 90≤$\Delta A$, adsorptivity is very good. G2 (B): 70≤$\Delta A$<90, adsorptivity is good. G3 (C): 50≤$\Delta A$<70, adsorptivity is pretty good. G4 (D): $\Delta A$<50, adsorptivity is poor.

—Gas Decomposability—

G1 (A): 30≤$\Delta S$, decomposability is very good. G2 (B): 15≤$\Delta S$<30, decomposability is good. G3 (C): 5≤$\Delta S$<15, decomposability is pretty good. G4 (D): $\Delta S$<5, decomposability is poor.

[Amount of coarse particles] A weight of a sieve with an opening of 20 μm is precisely measured to 0.01 g unit, and 1.00 g of titanium oxide aerogel particles are passed through the sieve while suctioning with a dust collector. At that time, agglomerates on a net are passed through a sieve while solving aggregates on the net of the sieve by a brush, and the amount of strong titanium oxide aerogel particles remaining on the sieve is measured as the coarse particle amount. The coarse particle index is calculated from the weight (g) of the sieve before and after passing through the titanium oxide aerogel particles by the following formula. The smaller the coarse particle index, the better the dispersibility. Coarse particle index (%)=(weight of sieve after adsorption−weight of sieve before adsorption)/1.0×100

—Coarse Particle Index—

G1 (B): 1% or less of coarse particles having a diameter of 20 μm

G2 (C): 5% or less of coarse particles having a diameter of 20 μm

G3 (D): more than 5% of coarse particles having a diameter of 20 μm

TABLE 1-1

| | Preparation of dispersion | | | | | | Surface treatment | | |
|---|---|---|---|---|---|---|---|---|---|
| | Alcohol | | Titanium alkoxide | | Reaction | Solvent removal | | Organometallic compound | |
| | Kinds | Amount [Parts] | Kinds | Amount [Parts] | temperature [° C.] | Solvent removal atmosphere | Treatment atmosphere | Kinds | Amount [parts] |
| Example 1 | Methanol | 115.4 | Tetrabutoxy titanium | 14.3 | 25 | Supercritical carbon dioxide | Supercritical carbon dioxide | Isobutyl trimethoxy silane | 3.4 |

TABLE 1-1-continued

| | Preparation of dispersion | | | | | | Surface treatment | | |
|---|---|---|---|---|---|---|---|---|---|
| | Alcohol | | Titanium alkoxide | | Reaction | Solvent removal | | Organometallic compound | |
| | Kinds | Amount [Parts] | Kinds | Amount [Parts] | temperature [° C.] | Solvent removal atmosphere | Treatment atmosphere | Kinds | Amount [parts] |
| Example 2 | Methanol | 115.4 | Tetrabutoxy titanium | 4.8 | 25 | Supercritical carbon dioxide | Supercritical carbon dioxide | Isobutyl trimethoxy silane | 1.1 |
| Example 3 | Methanol | 115.4 | Tetrabutoxy titanium | 71.5 | 25 | Supercritical carbon dioxide | Supercritical carbon dioxide | Isobutyl trimethoxy silane | 16.8 |
| Example 4 | Methanol | 115.4 | Tetrabutoxy titanium | 14.3 | 25 | Supercritical carbon dioxide | Supercritical carbon dioxide | Isobutyl trimethoxy silane | 3.4 |
| Example 5 | Methanol | 115.4 | Tetrapropoxy titanium | 14.3 | 25 | Supercritical carbon dioxide | Supercritical carbon dioxide | Isobutyl trimethoxy silane | 4.0 |
| Example 6 | Methanol | 115.4 | Tetrabutoxy titanium | 14.3 | 25 | Supercritical carbon dioxide | Supercritical carbon dioxide | Isobutyl trimethoxy silane | 3.4 |
| Example 7 | Methanol | 115.4 | Tetrabutoxy titanium | 14.3 | 25 | Supercritical carbon dioxide | Supercritical carbon dioxide | Isobutyl trimethoxy silane | 3.4 |
| Example 8 | Methanol | 115.4 | Tetrabutoxy titanium | 14.3 | 25 | Supercritical carbon dioxide | Supercritical carbon dioxide | Hexyl trimethoxy silane | 3.4 |
| Example 9 | Methanol | 115.4 | Tetrabutoxy titanium | 14.3 | 25 | Supercritical carbon dioxide | Supercritical carbon dioxide | Decyl trimethoxy silane | 3.4 |
| Example 10 | Methanol | 115.4 | Tetrabutoxy titanium | 14.3 | 25 | Supercritical carbon dioxide | Supercritical carbon dioxide | Methyl trimethoxy silane | 3.4 |

TABLE 1-2

| | Heat treatment | | | Particle characteristics | | | |
|---|---|---|---|---|---|---|---|
| | Temperature [° C.] | Time [Minutes] | Oxygen concentration [% by volume] | BET specific area [m²/g] | Primary particle diameter [nm] | Volume average particle diameter | GSDv [—] |
| Example 1 | 380 | 60 | 20 | 400 | 80 | 1.05 | 3.2 |
| Example 2 | 380 | 60 | 20 | 140 | 110 | 0.6 | 2.1 |
| Example 3 | 380 | 60 | 20 | 980 | 20 | 2.8 | 8.5 |
| Example 4 | 380 | 60 | 20 | 405 | 80 | 1.05 | 3.2 |
| Example 5 | 380 | 60 | 20 | 405 | 80 | 1.05 | 3.2 |
| Example 6 | 180 | 60 | 20 | 360 | 78 | 1.05 | 3.2 |
| Example 7 | 500 | 60 | 20 | 440 | 78 | 1.05 | 3.2 |
| Example 8 | 380 | 60 | 20 | 400 | 80 | 1.05 | 3.2 |
| Example 9 | 380 | 60 | 20 | 390 | 80 | 1.05 | 3.2 |
| Example 10 | 380 | 60 | 20 | 400 | 80 | 1.05 | 3.2 |

| | UV-Vis characteristics | | | Performance Evaluation | | |
|---|---|---|---|---|---|---|
| | Absorbance at wavelength of 450 nm | Absorbance at wavelength of 600 nm | Absorbance at wavelength of 750 nm | Gas adsorptivity | Gas decomposability | Coarse particle index |
| Example 1 | 0.6 | 0.37 | 0.25 | G1 (A) | G1 (A) | G1 (B) |
| Example 2 | 0.58 | 0.36 | 0.24 | G2 (B) | G1 (A) | G1 (B) |
| Example 3 | 0.58 | 0.37 | 0.25 | G2 (B) | G1 (A) | G1 (B) |
| Example 4 | 0.56 | 0.37 | 0.25 | G1 (A) | G1 (A) | G1 (B) |
| Example 5 | 0.58 | 0.37 | 0.26 | G1 (A) | G1 (A) | G1 (B) |
| Example 6 | 0.24 | 0.15 | 0.14 | G2 (B) | G2 (B) | G1 (B) |

TABLE 1-2-continued

| | | | | | | |
|---|---|---|---|---|---|---|
| Example 7 | 0.2 | 0.12 | 0.09 | G2 (B) | G2 (B) | G2 (C) |
| Example 8 | 0.61 | 0.35 | 0.26 | G2 (B) | G1 (A) | G1 (B) |
| Example 9 | 0.47 | 0.34 | 0.28 | G2 (B) | G1 (A) | G1 (B) |
| Example 10 | 0.38 | 0.2 | 0.16 | G2 (B) | G2 (B) | G1 (B) |

TABLE 2-1

| | Preparation of dispersion | | | | | | Surface treatment | | |
|---|---|---|---|---|---|---|---|---|---|
| | Alcohol | | Titanium alkoxide | | Reaction | Solvent removal | | Organometallic compound | |
| | Kinds | Amount [Parts] | Kinds | Amount [Parts] | temperature [° C.] | Solvent removal atmosphere | Treatment atmosphere | Kinds | Amount [parts] |
| Example 11 | Methanol | 115.4 | Tetrabutoxy titanium | 14.3 | 25 | Supercritical carbon dioxide | Supercritical carbon dioxide | Dodecyl trimethoxy silane | 3.4 |
| Example 12 | Methanol | 115.4 | Tetrabutoxy titanium | 14.3 | 25 | Supercritical carbon dioxide | Supercritical carbon dioxide | Octadecyl trimethoxy silane | 3.4 |
| Example 13 | Methanol | 115.4 | Tetrabutoxy titanium | 14.3 | 25 | Supercritical carbon dioxide | Supercritical carbon dioxide | Octyl trimethoxy silane | 3.4 |
| Example 14 | Methanol | 115.4 | Tetrabutoxy titanium | 14.3 | 25 | Supercritical carbon dioxide | Supercritical carbon dioxide | Phenyl trimethoxy silane | 3.4 |
| Example 15 | Methanol | 115.4 | Tetrabutoxy titanium | 14.3 | 25 | Supercritical carbon dioxide | Supercritical carbon dioxide | Dimethoxy (methyl) (octyl) silane | 3.4 |
| Example 16 | Methanol | 115.4 | Tetrabutoxy titanium | 14.3 | 25 | Supercritical carbon dioxide | Supercritical carbon dioxide | Tri-n-hexyl chlorosilane | 3.4 |
| Example 17 | Methanol | 115.4 | Tetrabutoxy titanium | 14.3 | 25 | Supercritical carbon dioxide | Supercritical carbon dioxide | n-octyl dimethyl chlorosilane | 3.4 |
| Example 18 | Methanol | 115.4 | Tetrabutoxy titanium | 14.3 | 25 | Supercritical carbon dioxide | Supercritical carbon dioxide | Hexamethyl disilazane | 3.4 |
| Example 19 | Methanol | 115.4 | Tetrabutoxy titanium | 14.3 | 25 | Supercritical carbon dioxide | Supercritical carbon dioxide | Isopropyl triisostearoyl | 3.4 |
| Example 20 | Methanol | 115.4 | Tetrabutoxy titanium | 14.3 | 25 | Supercritical carbon dioxide | Supercritical carbon dioxide | Acetoalkoxy aluminum diisopropylate | 3.4 |
| Example 21 | Methanol | 115.4 | Tetrabutoxy titanium | 14.3 | 25 | Supercritical carbon dioxide | Nitrogen (dry type) | Isobutyl trimethoxy silane | 3.4 |

TABLE 2-2

| | Heat treatment | | | Particle characteristics | | | |
|---|---|---|---|---|---|---|---|
| | Temperature [° C.] | Time [Minutes] | Oxygen concentration [% by volume] | BET specific area [m$^2$/g] | Primary particle diameter [nm] | Volume average particle diameter | GSDv [—] |
| Example 11 | 380 | 60 | 20 | 400 | 80 | 1.05 | 3.2 |
| Example 12 | 380 | 60 | 20 | 395 | 80 | 1.05 | 3.2 |
| Example 13 | 380 | 60 | 20 | 400 | 80 | 1.05 | 3.2 |
| Example 14 | 380 | 60 | 20 | 400 | 80 | 1.05 | 3.2 |
| Example 15 | 380 | 60 | 20 | 400 | 80 | 1.05 | 3.2 |
| Example 16 | 380 | 60 | 20 | 400 | 80 | 1.05 | 3.2 |
| Example 17 | 380 | 60 | 20 | 400 | 80 | 1.05 | 3.2 |
| Example 18 | 380 | 60 | 20 | 400 | 80 | 1.05 | 3.2 |
| Example 19 | 380 | 60 | 20 | 380 | 80 | 1.05 | 3.2 |
| Example 20 | 380 | 60 | 20 | 385 | 80 | 1.05 | 3.2 |
| Example 21 | 380 | 60 | 20 | 320 | 80 | 1.05 | 3.2 |

TABLE 2-2-continued

|  | UV-Vis characteristics | | | Performance Evaluation | | |
|---|---|---|---|---|---|---|
|  | Absorbance at wavelength of 450 nm | Absorbance at wavelength of 600 nm | Absorbance at wavelength of 750 nm | Gas adsorptivity | Gas decomposability | Coarse particle index |
| Example 11 | 0.38 | 0.2 | 0.13 | G2 (B) | G2 (B) | G1 (B) |
| Example 12 | 0.43 | 0.31 | 0.25 | G2 (B) | G2 (B) | G1 (B) |
| Example 13 | 0.42 | 0.3 | 0.23 | G2 (B) | G2 (B) | G1 (B) |
| Example 14 | 0.48 | 0.28 | 0.21 | G2 (B) | G2 (B) | G1 (B) |
| Example 15 | 0.41 | 0.24 | 0.19 | G2 (B) | G1 (A) | G1 (B) |
| Example 16 | 0.5 | 0.25 | 0.16 | G2 (B) | G1 (A) | G1 (B) |
| Example 17 | 0.46 | 0.24 | 0.17 | G2 (B) | G1 (A) | G1 (B) |
| Example 18 | 0.4 | 0.19 | 0.12 | G2 (B) | G2 (B) | G1 (B) |
| Example 19 | 0.46 | 0.35 | 0.26 | G2 (B) | G1 (A) | G1 (B) |
| Example 20 | 0.46 | 0.35 | 0.26 | G2 (B) | G1 (A) | G1 (B) |
| Example 21 | 0.6 | 0.37 | 0.25 | G2 (B) | G1 (A) | G1 (B) |

TABLE 3-1

|  | Preparation of dispersion | | | | | | Surface treatment | | |
|---|---|---|---|---|---|---|---|---|---|
|  | Alcohol | | Titanium alkoxide | | Reaction | Solvent removal | | Organometallic compound | |
|  | Kinds | Amount [Parts] | Kinds | Amount [Parts] | temperature [° C.] | Solvent removal atmosphere | Treatment atmosphere | Kinds | Amount [parts] |
| Comparative Example 1A | Methanol | 115.4 | Tetrabutoxy titanium | 14.3 | 25 | Supercritical carbon dioxide | — | — | — |
| Comparative Example 2A | Methanol | 115.4 | Tetrabutoxy titanium | 14.3 | 25 | Supercritical carbon dioxide | — | — | — |
| Comparative Example 3A | Methanol | 115.4 | Tetrabutoxy titanium | 14.3 | 25 | Supercritical carbon dioxide | Supercritical carbon dioxide | Isobutyl trimethoxy silane | 3.4 |
| Comparative Example 4A | Methanol | 115.4 | Tetrabutoxy titanium | 14.3 | 25 | Supercritical carbon dioxide | Supercritical carbon dioxide | Isobutyl trimethoxy silane | 3.4 |
| Comparative Example 5A | Methanol | 115.4 | Tetrabutoxy titanium | 14.3 | 25 | Supercritical carbon dioxide | Supercritical carbon dioxide | Isobutyl trimethoxy silane | 3.4 |
| Comparative Example 6A | Methanol | 115.4 | Tetrabutoxy titanium | 100.1 | 25 | Supercritical carbon dioxide | Supercritical carbon dioxide | Isobutyl trimethoxy silane | 3.4 |
| Comparative Example 7A | Methanol | 115.4 | Tetrabutoxy titanium | 3.3 | 25 | Supercritical carbon dioxide | Supercritical carbon dioxide | Isobutyl trimethoxy silane | 3.4 |

TABLE 3-2

|  | Heat treatment | | | Particle characteristics | | | |
|---|---|---|---|---|---|---|---|
|  | Temperature [° C.] | Time [Minutes] | Oxygen concentration [% by volume] | BET specific area [m$^2$/g] | Primary particle diameter [nm] | Volume average particle diameter | GSDv [-] |
| Comparative Example 1A | None | None | None | 400 | 80 | 1.05 | 3.2 |
| Comparative Example 2A | 380 | 60 | 20 | 410 | 80 | 1.05 | 3.2 |
| Comparative Example 3A | None | None | None | 380 | 80 | 1.05 | 3.2 |

TABLE 3-2-continued

| | | | | | | | |
|---|---|---|---|---|---|---|---|
| Comparative Example 4A | 160 | 60 | 20 | 415 | 80 | 1.05 | 3.2 |
| Comparative Example 5A | 600 | 60 | 20 | 425 | 80 | 1.05 | 3.2 |
| Comparative Example 6A | 380 | 60 | 20 | 1100 | 15 | 3.6 | 10.3 |
| Comparative Example 7A | 380 | 60 | 20 | 100 | 130 | 0.15 | 1.4 |

| | UV-Vis characteristics | | | Performance Evaluation | | |
|---|---|---|---|---|---|---|
| | Absorbance at wavelength of 450 nm | Absorbance at wavelength of 600 nm | Absorbance at wavelength of 750 nm | Gas adsorptivity | Gas decomposability | Coarse particle index |
| Comparative Example 1A | 0 | 0 | 0 | G3 (C) | G4 (D) | G1 (B) |
| Comparative Example 2A | 0 | 0 | 0 | G3 (C) | G4 (D) | G1 (B) |
| Comparative Example 3A | 0 | 0 | 0 | G3 (C) | G4 (D) | G2 (C) |
| Comparative Example 4A | 0 | 0 | 0 | G3 (C) | G4 (D) | G1 (B) |
| Comparative Example 5A | 0.01 | 0.01 | 0.01 | G3 (C) | G3 (C) | G2 (C) |
| Comparative Example 6A | 0.6 | 0.38 | 0.24 | G2 (B) | G2 (B) | G3 (D) |
| Comparative Example 7A | 0.2 | 0.09 | 0.06 | G4 (D) | G3 (C) | G2 (C) |

TABLE 4

| | Titanium oxide | | | | Particle characteristics | | |
|---|---|---|---|---|---|---|---|
| | | Surface treatment | | | BET specific area [m²/g] | Volume average particle diameter [μm] | GSDv [—] |
| | Kinds | Organometallic compound | Amount [% by mass] | Heat treatment | | | |
| Comparative Example 1B | Anatase-type titanium oxide particle | — | — | No heat treatment | 135 | 2.7 | 10.8 |
| Comparative Example 2B | Anatase-type titanium oxide particle | — | — | Heat treatment at 380° C. | 135 | 2.7 | 10.8 |
| Comparative Example 3B | Anatase-type titanium oxide particle | Isobutyl trimethoxy silane | 35 | No heat treatment | 170 | 0.03 | 1.4 |

| | UV-Vis characteristics | | | Performance Evaluation | | |
|---|---|---|---|---|---|---|
| | Absorbance at wavelength of 450 nm | Absorbance at wavelength of 600 nm | Absorbance at wavelength of 750 nm | Gas adsorptivity | Gas decomposability | Coarse particle index |
| Comparative Example 1B | 0 | 0 | 0 | G4 (D) | G4 (D) | G2 (C) |
| Comparative Example 2B | 0 | 0 | 0 | G4 (D) | G4 (D) | G2 (C) |
| Comparative Example 3B | 0 | 0 | 0 | G4 (D) | G4 (D) | G2 (C) |

From the results of the performance evaluations illustrated in Tables 1 to 4, it is understood that the present examples have the excellent photocatalytic activity (gas adsorptivity, gas decomposability) in the visible light region than as compared with the comparative examples (except for Comparative Example 6A) In addition, it is understood that the present examples are excellent in the photocatalytic activity (gas adsorptivity and gas decomposability) in the visible light region while maintaining small amount of the coarse particles, and secures the dispersibility, as compared with Comparative Example 6A.

TABLE 5-1

| | Preparation of dispersion | | | | |
|---|---|---|---|---|---|
| | Alcohol | | Titanium alkoxide | | |
| | Kinds | Amount [Parts] | Kinds | Amount [Parts] | Holding time [Minutes] |
| Example 22 | Methanol | 115.4 | Tetrabutoxy titanium | 14.3 | 30 |
| Example 23 | Methanol | 115.4 | Tetrabutoxy titanium | 5.2 | 30 |
| Example 24 | Methanol | 115.4 | Tetrabutoxy titanium | 73.0 | 30 |
| Example 25 | Methanol | 115.4 | Tetrabutoxy titanium | 14.3 | 30 |
| Example 26 | Methanol | 115.4 | Tetrabutoxy titanium | 12.5 | 30 |
| Example 27 | Methanol | 115.4 | Tetrabutoxy titanium | 14.3 | 30 |
| Example 28 | Methanol | 115.4 | Tetrabutoxy titanium | 14.3 | 30 |
| Example 29 | Methanol | 115.4 | Tetrabutoxy titanium | 14.3 | 45 |
| Example 30 | Methanol | 115.4 | Tetrabutoxy titanium | 14.3 | 35 |
| Example 31 | Methanol | 115.4 | Tetrabutoxy titanium | 14.3 | 30 |
| Example 32 | Methanol | 115.4 | Tetrabutoxy titanium | 14.3 | 35 |
| Example 33 | Methanol | 115.4 | Tetrabutoxy titanium | 14.3 | 40 |
| Example 34 | Methanol | 115.4 | Tetrabutoxy titanium | 14.3 | 40 |
| Example 35 | Methanol | 115.4 | Tetrabutoxy titanium | 14.3 | 35 |
| Example 36 | Methanol | 115.4 | Tetrabutoxy titanium | 14.3 | 30 |
| Example 37 | Methanol | 115.4 | Tetrabutoxy titanium | 14.3 | 30 |
| Example 38 | Methanol | 115.4 | Tetrabutoxy titanium | 14.3 | 30 |
| Example 39 | Methanol | 115.4 | Tetrabutoxy titanium | 14.3 | 30 |
| Example 40 | Methanol | 115.4 | Tetrabutoxy titanium | 14.3 | 30 |
| Example 41 | Methanol | 115.4 | Tetrabutoxy titanium | 14.3 | 30 |
| Example 42 | Methanol | 115.4 | Tetrabutoxy titanium | 14.3 | 30 |

TABLE 5-2

| | Surface treatment | | | |
|---|---|---|---|---|
| | | | Organometallic compound | |
| | Solvent removal Treatment atmosphere | Treatment atmosphere | Kinds | Amount [parts] |
| Example 22 | Supercritical carbon dioxide | Supercritical carbon dioxide | Isobutyl trimethoxy silane | 3.4 |
| Example 23 | Supercritical carbon dioxide | Supercritical carbon dioxide | Isobutyl trimethoxy silane | 3.4 |
| Example 24 | Supercritical carbon dioxide | Supercritical carbon dioxide | Isobutyl trimethoxy silane | 3.4 |
| Example 25 | Supercritical carbon dioxide | Supercritical carbon dioxide | Isobutyl trimethoxy silane | 3.4 |
| Example 26 | Supercritical carbon dioxide | Supercritical carbon dioxide | Isobutyl trimethoxy silane | 3.5 |
| Example 27 | Supercritical carbon dioxide | Supercritical carbon dioxide | Isobutyl trimethoxy silane | 3.4 |
| Example 28 | Supercritical carbon dioxide | Supercritical carbon dioxide | Isobutyl trimethoxy silane | 3.4 |
| Example 29 | Supercritical carbon dioxide | Supercritical carbon dioxide | Hexyl trimethoxy silane | 3.9 |
| Example 30 | Supercritical carbon dioxide | Supercritical carbon dioxide | Decyl trimethoxy silane | 4.9 |
| Example 31 | Supercritical carbon dioxide | Supercritical carbon dioxide | Methyl trimethoxy silane | 2.6 |
| Example 32 | Supercritical carbon dioxide | Supercritical carbon dioxide | Dodecyl trimethoxy silane | 5.5 |
| Example 33 | Supercritical carbon dioxide | Supercritical carbon dioxide | Octadecyl trimethoxy silane | 7.1 |
| Example 34 | Supercritical carbon dioxide | Supercritical carbon dioxide | Octyl trimethoxy silane | 4.7 |
| Example 35 | Supercritical carbon dioxide | Supercritical carbon dioxide | Phenyl trimethoxy silane | 3.7 |
| Example 36 | Supercritical carbon dioxide | Supercritical carbon dioxide | Dimethoxy (methyl) (octyl) silane | 4.1 |
| Example 37 | Supercritical carbon dioxide | Supercritical carbon dioxide | Tri-n-hexyl chlorosilane | 4.7 |
| Example 38 | Supercritical carbon dioxide | Supercritical carbon dioxide | n-octyl dimethyl chlorosilane | 3.9 |
| Example 39 | Supercritical carbon dioxide | Supercritical carbon dioxide | Hexamethyl disilazane | 3.0 |

TABLE 5-2-continued

| | Surface treatment | | | |
|---|---|---|---|---|
| | | | Organometallic compound | |
| | Solvent removal Treatment atmosphere | Treatment atmosphere | Kinds | Amount [parts] |
| Example 40 | Supercritical carbon dioxide | Supercritical carbon dioxide | Isopropyl triisostearoyl | 5.4 |
| Example 41 | Supercritical carbon dioxide | Supercritical carbon dioxide | Acetoalkoxy aluminum diisopropylate | 5.2 |
| Example 42 | Supercritical carbon dioxide | Nitrogen (dry type) | Isobutyl trimethoxy silane | 3.4 |

TABLE 5-3

| | Characteristics of titanium oxide aerogel particle | | | | | | | |
|---|---|---|---|---|---|---|---|---|
| | Heat treatment | | Element ratio C/Ti on surface | Element ratio ΔC/Ti on surface before and after UV irradiation | BET specific area [m²/g] | Da [nm] | Dp [μm] | GSDv |
| | Temperature [° C.] | Time [Minutes] | | | | | | |
| Example 22 | 380 | 60 | 0.92 | 0.02 | 420 | 83 | 1.50 | 3.5 |
| Example 23 | 380 | 60 | 1.40 | 0.20 | 131 | 105 | 0.50 | 2.1 |
| Example 24 | 380 | 60 | 0.50 | 0.10 | 974 | 8 | 2.50 | 8.5 |
| Example 25 | 370 | 60 | 0.90 | 0.05 | 400 | 82 | 1.10 | 2.9 |
| Example 26 | 380 | 60 | 0.90 | 0.03 | 395 | 80 | 1.05 | 3.2 |
| Example 27 | 180 | 60 | 1.45 | 0.20 | 350 | 78 | 1.05 | 3.2 |
| Example 28 | 500 | 60 | 0.40 | 0.03 | 450 | 78 | 1.05 | 3.2 |
| Example 29 | 370 | 60 | 0.96 | 0.02 | 400 | 77 | 1.05 | 3.2 |
| Example 30 | 360 | 60 | 1.22 | 0.07 | 315 | 98 | 1.05 | 3.2 |
| Example 31 | 355 | 60 | 0.63 | 0.01 | 600 | 51 | 1.05 | 3.2 |
| Example 32 | 300 | 60 | 1.35 | 0.11 | 290 | 108 | 1.05 | 3.2 |
| Example 33 | 280 | 60 | 1.45 | 0.15 | 220 | 118 | 1.05 | 3.2 |
| Example 34 | 350 | 60 | 1.15 | 0.05 | 350 | 92 | 1.05 | 3.2 |
| Example 35 | 360 | 60 | 0.92 | 0.02 | 415 | 74 | 1.05 | 3.2 |
| Example 36 | 370 | 60 | 1.01 | 0.03 | 380 | 81 | 1.05 | 3.2 |
| Example 37 | 320 | 60 | 1.15 | 0.14 | 335 | 92 | 1.05 | 3.2 |
| Example 38 | 350 | 60 | 0.96 | 0.03 | 400 | 77 | 1.05 | 3.2 |
| Example 39 | 370 | 60 | 0.75 | 0.02 | 510 | 60 | 1.05 | 3.2 |
| Example 40 | 365 | 60 | 1.32 | 0.02 | 300 | 106 | 1.05 | 3.2 |
| Example 41 | 370 | 60 | 1.27 | 0.03 | 300 | 102 | 1.05 | 3.2 |
| Example 42 | 380 | 60 | 0.90 | 0.08 | 310 | 80 | 1.05 | 3.5 |

TABLE 5-4

| | UV-Vis characteristics | | | Performance Evaluation | | |
|---|---|---|---|---|---|---|
| | Absorbance at wavelength of 450 nm | Absorbance at wavelength of 600 nm | Absorbance at wavelength of 750 nm | Gas adsorptivity | Gas decomposability | Coarse particle index |
| Example 22 | 0.60 | 0.43 | 0.23 | G1 (A) | G1 (A) | G1 (B) |
| Example 23 | 0.57 | 0.38 | 0.24 | G2 (B) | G1 (A) | G1 (B) |
| Example 24 | 0.58 | 0.36 | 0.25 | G2 (B) | G1 (A) | G1 (B) |
| Example 25 | 0.58 | 0.35 | 0.23 | G1 (A) | G1 (A) | G1 (B) |
| Example 26 | 0.58 | 0.37 | 0.26 | G1 (A) | G1 (A) | G1 (B) |
| Example 27 | 0.24 | 0.15 | 0.14 | G2 (B) | G2 (B) | G1 (B) |
| Example 28 | 0.20 | 0.12 | 0.09 | G2 (B) | G2 (B) | G2 (C) |

TABLE 5-4-continued

| | UV-Vis characteristics | | | Performance Evaluation | | |
|---|---|---|---|---|---|---|
| | Absorbance at wavelength of 450 nm | Absorbance at wavelength of 600 nm | Absorbance at wavelength of 750 nm | Gas adsorptivity | Gas decomposability | Coarse particle index |
| Example 29 | 0.61 | 0.35 | 0.26 | G2 (B) | G1 (A) | G2 (C) |
| Example 30 | 0.47 | 0.34 | 0.28 | G2 (B) | G1 (A) | G2 (C) |
| Example 31 | 0.38 | 0.20 | 0.16 | G2 (B) | G2 (B) | G1 (B) |
| Example 32 | 0.38 | 0.20 | 0.13 | G2 (B) | G2 (B) | G1 (B) |
| Example 33 | 0.43 | 0.31 | 0.25 | G2 (B) | G2 (B) | G1 (B) |
| Example 34 | 0.42 | 0.30 | 0.23 | G2 (B) | G2 (B) | G2 (C) |
| Example 35 | 0.48 | 0.28 | 0.21 | G2 (B) | G2 (B) | G1 (B) |
| Example 36 | 0.41 | 0.24 | 0.19 | G2 (B) | G1 (A) | G2 (C) |
| Example 37 | 0.50 | 0.25 | 0.16 | G2 (B) | G1 (A) | G1 (B) |
| Example 38 | 0.46 | 0.24 | 0.17 | G2 (B) | G1 (A) | G2 (C) |
| Example 39 | 0.40 | 0.19 | 0.12 | G2 (B) | G2 (B) | G1 (B) |
| Example 40 | 0.46 | 0.35 | 0.26 | G2 (B) | G1 (A) | G1 (B) |
| Example 41 | 0.46 | 0.35 | 0.26 | G2 (B) | G1 (A) | G1 (B) |
| Example 42 | 0.60 | 0.37 | 0.25 | G2 (B) | G1 (A) | G1 (B) |

TABLE 6-1

| | Preparation of dispersion | | | | | Solvent removal | Surface treatment | | | Heat treatment | |
|---|---|---|---|---|---|---|---|---|---|---|---|
| | Alcohol | | Titanium alkoxide | | Holding | | | Organometallic compound | | | |
| | Kinds | Amount [Parts] | Kinds | Amount [Parts] | time [Minutes] | Treatment atmosphere | Treatment atmosphere | Kinds | Amount [parts] | Temperature [° C.] | Time [Minutes] |
| Comparative Example 8 | Methanol | 115.4 | Tetrabutoxy titanium | 14.3 | 30 | Supercritical carbon dioxide | — | — | — | None | None |
| Comparative Example 9 | Methanol | 115.4 | Tetrabutoxy titanium | 14.3 | 30 | Supercritical carbon dioxide | — | — | — | 380 | 60 |
| Comparative Example 10 | Methanol | 115.4 | Tetrabutoxy titanium | 14.3 | 30 | Supercritical carbon dioxide | Supercritical carbon dioxide | Isobutyl trimethoxy silane | 3.4 | None | None |
| Comparative Example 11 | Methanol | 115.4 | Tetrabutoxy titanium | 14.3 | 30 | Supercritical carbon dioxide | Supercritical carbon dioxide | Isobutyl trimethoxy silane | 3.4 | 120 | 60 |
| Comparative Example 12 | Methanol | 115.4 | Tetrabutoxy titanium | 14.3 | 30 | Supercritical carbon dioxide | Supercritical carbon dioxide | Isobutyl trimethoxy silane | 3.4 | 600 | 60 |
| Comparative Example 13 | Methanol | 115.4 | Tetrabutoxy titanium | 110 | 30 | Supercritical carbon dioxide | Supercritical carbon dioxide | Isobutyl trimethoxy silane | 25.8 | 380 | 60 |
| Comparative Example 14 | Methanol | 115.4 | Tetrabutoxy titanium | 3.5 | 30 | Supercritical carbon dioxide | Supercritical carbon dioxide | Isobutyl trimethoxy silane | 0.8 | 380 | 60 |

TABLE 6-2

| | Heat treatment | | Characteristics of titanium oxide aerogel particle | | | | | |
|---|---|---|---|---|---|---|---|---|
| | Temperature [° C.] | Time [Minutes] | Element ratio C/Ti on surface | Element ratio ΔC/Ti on surface before and after UV irradiation | BET specific area [m²/g] | Da [nm] | Dp [μm] | GSDv |
| Comparative Example 8 | None | None | 0 | 0 | 405 | 85 | 1.01 | 3.1 |
| Comparative Example 9 | 380 | 60 | 0 | 0 | 420 | 85 | 1.01 | 3.1 |
| Comparative Example 10 | None | None | 1.90 | 0.09 | 390 | 83 | 1.02 | 3.1 |
| Comparative Example 11 | 120 | 60 | 1.70 | 0.40 | 120 | 85 | 1.02 | 3.1 |
| Comparative Example 12 | 600 | 60 | 0.20 | 0 | 130 | 83 | 1002 | 3.1 |
| Comparative Example 13 | 380 | 60 | 0.30 | 0.02 | 1,100 | 18 | 3.80 | 10.5 |
| Comparative Example 14 | 380 | 60 | 1.50 | 0.02 | 100 | 140 | 0.16 | 1.5 |

| | UV-Vis characteristics | | | Performance Evaluation | | |
|---|---|---|---|---|---|---|
| | Absorbance at wavelength of 450 nm | Absorbance at wavelength of 600 nm | Absorbance at wavelength of 750 nm | Gas adsorptivity | Gas decomposability | Coarse particle index |
| Comparative Example 8 | 0 | 0 | 0 | G3 (C) | G4 (D) | G1 (B) |
| Comparative Example 9 | 0 | 0 | 0 | G3 (C) | G4 (D) | G1 (B) |
| Comparative Example 10 | 0 | 0 | 0 | G3 (C) | G4 (D) | G2 (C) |
| Comparative Example 11 | 0 | 0 | 0 | G3 (C) | G4 (D) | G1 (B) |
| Comparative Example 12 | 0.02 | 0.02 | 0.02 | G3 (C) | G4 (D) | G2 (C) |
| Comparative Example 13 | 0.62 | 0.40 | 0.25 | G2 (B) | G2 (B) | G3 (D) |
| Comparative Example 14 | 0.10 | 0.08 | 0.05 | G4 (D) | G3 (C) | G2 (C) |

TABLE 7

| | Kinds of particles | Surface treatment | | Characteristics of titanium oxide aerogel particle | | | | | |
|---|---|---|---|---|---|---|---|---|---|
| | | Treatment atmosphere | Organometallic compound Kinds | Heat treatment | | Element ratio C/Ti on surface | BET specific area [m²/g] | Dp [μm] | GSDv |
| | | | | Temperature [° C.] | Time [Minutes] | | | | |
| Comparative Example 15 | Anatase-type titanium oxide particle | — | — | — | — | 0 | 135 | 2.7 | 10.8 |
| Comparative Example 16 | Anatase-type titanium oxide particle | — | — | 400 | 60 | 0 | 135 | 2.7 | 10.8 |
| Comparative Example 17 | Anatase-type titanium oxide particle | Supercritical carbon dioxide | Isobutyl trimethoxy silane | — | — | 1.80 | 170 | 0.03 | 1.4 |

| | UV-Vis characteristics | | | Performance Evaluation | | |
|---|---|---|---|---|---|---|
| | Absorbance at wavelength of 450 nm | Absorbance at wavelength of 600 nm | Absorbance at wavelength of 750 nm | Gas adsorptivity | Gas decomposability | Coarse particle index |
| Comparative Example 15 | 0 | 0 | 0 | G4 (D) | G4 (D) | G2 (C) |
| Comparative Example 16 | 0 | 0 | 0 | G4 (D) | G4 (D) | G2 (C) |
| Comparative Example 17 | 0 | 0 | 0 | G4 (D) | G4 (D) | G2 (C) |

Details of a portion of the organometallic compounds indicated in Tables 5 to 7 are as described below.

Acetoalkoxy aluminum diisopropylate: PLAINACT AL-M produced by Ajinomoto Co., Inc.

Isopropyl triisostearoyl titanate: PLAINACT TTS produced by Ajinomoto Co., Inc.

From the results of the performance evaluations illustrated in Tables 5 to 7, it is understood that the present examples are excellent in the photocatalytic activity in the visible light region, and secures the dispersibility, as compared with the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A titanium oxide aerogel particle comprising:
   a titanium oxide aerogel particle, and
   a metallic compound that has a metal atom and a hydrocarbon group, the metallic compound being bonded to a surface of the titanium oxide aerogel particle via an oxygen atom,
   wherein:
   the titanium oxide aerogel particle has a BET specific surface area of 120 m$^2$/g to 1000 m$^2$/g, and has absorption at wavelengths of 450 nm and 750 nm, and
   an element ratio C/Ti of carbon C to titanium Ti on the surface is in a range of 0.3 to 1.5.

2. The titanium oxide aerogel particle according to claim 1,
   wherein the titanium oxide aerogel particle satisfies the following expression, $0.01 \leq A \leq 0.3$, wherein A represents a reduction amount of the element ratio C/Ti when the titanium oxide aerogel particle is irradiated with ultraviolet rays having a wavelength of 352 nm, at an irradiation intensity of 1.3 mW/cm$^2$ for 20 hours.

3. The titanium oxide aerogel particle according to claim 1,
   wherein the titanium oxide aerogel particle has absorption at wavelengths in the entire range of 400 nm to 800 nm.

4. The titanium oxide aerogel particle according to claim 1,
   wherein the hydrocarbon group of the metallic compound is directly bonded to the metal atom.

5. The titanium oxide aerogel particle according to claim 1,
   wherein the metal atom is a silicon atom.

6. The titanium oxide aerogel particle according to claim 1,
   wherein the hydrocarbon group is a saturated or unsaturated aliphatic hydrocarbon group having 1 to 20 carbon atoms, or an aromatic hydrocarbon group having 6 to 20 carbon atoms.

7. The titanium oxide aerogel particle according to claim 6,
   wherein the hydrocarbon group is the saturated aliphatic hydrocarbon group having 1 to 20 carbon atoms.

8. The titanium oxide aerogel particle according to claim 7,
   wherein the hydrocarbon group is the saturated aliphatic hydrocarbon group having 4 to 10 carbon atoms.

9. The titanium oxide aerogel particle according to claim 1,
   wherein the titanium oxide aerogel particle has a volume average particle diameter of 0.1 μm to 3 μm, and a volume particle size distribution of 1.5 to 10.

10. The titanium oxide aerogel particle according to claim 1,
    wherein the titanium oxide aerogel particle is an aggregated particle in which primary particles are aggregated, and an average diameter of the primary particles is 1 nm to 120 nm.

11. The titanium oxide aerogel particle according to claim 1, wherein the BET specific surface area of the titanium oxide aerogel particle is 150 m$^2$/g to 900 m$^2$/g.

12. A photocatalyst forming composition comprising the titanium oxide aerogel particle according to claim 1; and at least one compound selected from the group consisting of a dispersion medium and a binder.

13. A photocatalyst comprising the titanium oxide aerogel particle according to claim 1.

* * * * *